US007474424B2

(12) United States Patent
Hokiyama

(10) Patent No.: US 7,474,424 B2
(45) Date of Patent: Jan. 6, 2009

(54) IMAGE FORMING APPARATUS, METHOD OF CONTROLLING THE IMAGE FORMING APPARATUS IN ORDER TO PROCESS A DUPLEX PRINTING SEQUENCE, PROGRAM, AND STORAGE MEDIUM

(75) Inventor: Takeshi Hokiyama, Kanagawa (JP)

(73) Assignee: Canon Kabushiki Kaisha (JP)

( * ) Notice: Subject to any disclaimer, the term of this patent is extended or adjusted under 35 U.S.C. 154(b) by 882 days.

(21) Appl. No.: 10/337,957

(22) Filed: Jan. 7, 2003

(65) Prior Publication Data

US 2003/0161671 A1 Aug. 28, 2003

(30) Foreign Application Priority Data

Jan. 7, 2002 (JP) ............................ 2002-000523

(51) Int. Cl.
*G06F 15/00* (2006.01)
*G03G 15/00* (2006.01)

(52) U.S. Cl. ...................................... 358/1.15; 399/363

(58) Field of Classification Search .................. 358/1.9, 358/1.12, 1.14, 1.15; 399/363-364, 382, 399/388, 390-391, 401, 407-408, 374; 271/3.19, 271/9.01, 9.05

See application file for complete search history.

(56) References Cited

U.S. PATENT DOCUMENTS 4,330,197 A * 5/1982 Smith et al. ................. 399/364
4,466,733 A * 8/1984 Pels ........................... 399/364
4,650,313 A * 3/1987 Koike ......................... 399/402
5,418,607 A * 5/1995 Tani ........................... 399/364
5,649,033 A * 7/1997 Morikawa et al. ........... 382/297
6,646,758 B1 * 11/2003 Anderson et al. .......... 358/1.15

FOREIGN PATENT DOCUMENTS

JP 54-18743 B2 2/1979
JP 63-2167850 A 9/1988
JP 9-254471 A 9/1997

* cited by examiner

*Primary Examiner*—Saeid Ebrahimi Dehkordy
(74) *Attorney, Agent, or Firm*—Rossi, Kimms & McDowell, LLP

(57) ABSTRACT

There is provided an image forming apparatus that can obtain proper output results without causing a difference in printing direction in both-sided printing or the like, and can improve the productivity and prevent jamming. According to control programs stored in a ROM, a CPU of the image forming apparatus provides control such that printing of all pages is performed in a both-sided print sequence when the total number of pages to be printed is odd, and provides control such that the last page is printed in a one-sided print sequence when the total number of pages to be printed is odd, no setting is made to make uniform the printing direction of all pages between the both-sided printing and the one-sided printing, and a page to be printed is the last page.

16 Claims, 11 Drawing Sheets

IMAGE FORMING APPARATUS, METHOD OF CONTROLLING THE IMAGE FORMING APPARATUS IN ORDER TO PROCESS A DUPLEX PRINTING SEQUENCE, PROGRAM, AND STORAGE MEDIUM

BACKGROUND OF THE INVENTION

1. Field of the Invention

The present invention relates to an image forming apparatus capable of performing both-sided printing, a method of controlling the same, a program for implementing the method, and a storage medium storing the program.

2. Description of the Related Art

Conventionally, there has been known a double-sided printing method using an image forming apparatus which prints one side of a printing sheet, then holds the semi-finished printing sheet with its one side having been printed on an intermediate tray, and inverts the sheet to print the other side thereof (a first example of double-sided printing). There has been known another double-sided printing method using an image forming apparatus which prints one side of a printing sheet, then conveys the sheet to a sheet inversion path to invert the sheet and print the other side thereof (a second example of double-sided printing).

The operation of an image forming apparatus according to the above-mentioned second example of both-sided printing will be described by referring to FIG. 2 showing an embodiment of the present invention for convenience. FIG. 2 is a schematic diagram showing a color image forming apparatus having four photosensitive drums. Upon start of both-sided printing, a sheet is picked up from a sheet cassette 221. The sheet is conveyed via the four photosensitive drums which are supplied with respective toners of colors YMCK (yellow, magenta, cyan, and black), so that one side of the sheet is printed, that is, a YMCK image is formed on one side of the sheet. The sheet with one side thereof having been printed is discharged once through a sheet discharge port to be switched back so that the sheet can be conveyed to a sheet inversion path. The sheet is then inverted, and a YMCK image is formed on the other side of the sheet. Thereafter, the sheet with both sides thereof having been printed is discharged through the sheet discharge port.

The second example of both-sided printing has the advantage that there is no necessity of providing an intermediate tray for receiving a semi-finished both-sided printing sheet as used in the first example of both-sided printing. In both the first example of both-sided printing and the second example of both-sided printing, there is the problem that a sheet is reconveyed even if there is only a print image to be printed on one side of a sheet as in the case where the total number of pages to be printed in a document is odd. Therefore, due to unnecessary sheet conveyance, the sheet jamming frequency is increased and the durability is deteriorated by wear of component parts used for sheet conveyance.

To address this problem, a printing apparatus disclosed in Japanese Laid-Open Patent Publication (Kokai) No. 9-254471, for example, is comprised of a page image determining means for determining whether a page includes an image to be printed, and a printing control means for providing control such that, in the case where the page image determining means determines that the page includes an image to be printed on only one side of a sheet, one-sided printing is performed without recirculating the sheet. With this arrangement, one-sided printing is performed on a sheet whose only one side is designated for printing, and this prevents unnecessary sheet conveyance, decreases the sheet jamming frequency, and prevents deterioration of the durability due to wear of component parts.

The above described prior art, however, has the following problem. According to the prior art, if it is determined that there is only a print image to be printed on one side of a sheet, such control is provided that one-sided printing is performed on the sheet, in any case. However, if this way of control is applied to prepunched sheets punched in advance for sheet binding and preprinted sheets on which images are printed in advance, a difference in printing direction can be caused by a both-sided printing mechanism. A brief description will now be given of this problem with reference to FIG. 7. Assuming that both-sided printing is performed on a five-page document (the first sheet (the first page and the second page), the second sheet (the third page and the fourth page), and the third sheet (the fifth page)), the third sheet is printed in a one-sided print sequence because, regarding the third sheet, there is a print image to be printed on only one side thereof (i.e. the fifth page).

In the printing operation, the first sheet is picked up first, and an image on the second page is printed on the first sheet. The first sheet is then conveyed to a sheet inversion path to be inverted, and an image on the first page is printed on the first sheet. The first sheet is then discharged to a sheet discharge tray. Similarly, an image on the fourth page and an image on the third page are printed on the second sheet in this order, and the second sheet is then discharged to the sheet discharge tray. When the third sheet is printed, the print sequence is switched from a both-sided print sequence to the one-sided print sequence, and an image on the fifth page is printed on the third sheet, which is then discharged to the sheet discharge tray. If the discharged three sheets are bound through binding holes, the printing direction of the fifth page is opposite to the printing direction of the other pages as shown on the right side of FIG. 7. This problem is also encountered in the case where preprinted sheets on which images are printed in advance are used.

SUMMARY OF THE INVENTION

It is therefore a first object of the present invention to provide an image forming apparatus and a method of controlling the same that solve the above described problems, and a program for implementing the method, and a storage medium storing the program.

It is a second object of the present invention to provide an image forming apparatus and a method of controlling the same that make it possible to make uniform the printing directions of all pages even in the case where a problem is caused by a difference in printing direction in both-sided printing, and a program for implementing the method, and a storage medium storing the program.

It is a third object of the present invention to provide an image forming apparatus and a method of controlling the same that make it possible to lower the sheet jamming frequency and prevent wear of component parts even in the case where there is a difference in printing direction in both-sided printing, and a program for implementing the method, and a storage medium storing the program.

To attain the above objects, in a first aspect of the present invention, there is provided an image forming apparatus capable of switching a print sequence between a double-sided print sequence in which both sides of a sheet are printed and a one-sided print sequence in which one side of a sheet is printed, comprising number-of-print pages determining means for determining whether the total number of pages to be printed is even or odd, printing direction setting means for making settings to make uniform a printing direction between the both-sided print sequence and the one-sided print sequence, and printing control means for providing control such that printing of all pages is performed in the both-sided print sequence when the number of print pages determining means determines that the total number of pages to be printed is odd and the printing direction setting means has made settings to make uniform the printing direction.

Preferably, the image forming apparatus according to the first aspect comprises last page determining means for determining whether a page to be printed is a last page, and wherein the printing control means provides control such that printing of the last page is performed in the one-sided print sequence when the number-of-print pages determining means determines that the total number of pages to be printed is odd, the printing direction setting means has made no settings to make uniform the printing direction, and the last page determining means determines that the page to be printed is the last page.

Preferably, the settings to make uniform the printing direction between the both-sided printing and the one-sided printing by the printing direction setting means include a setting of a prepunched sheet mode in which prepunched sheets with prepunched holes used for sheet binding are printed in the same direction between the both-sided print sequence and the one-sided print sequence, and a setting of a preprinted sheet mode in which sheets on which images are printed in advance are printed in the same direction between the both-sided print sequence and the one-sided print sequence.

Preferably, the settings to make uniform the printing direction between the both-sided printing and the one-sided printing can be made from an external apparatus that is connected to the image forming apparatus such that it is capable of performing data communications with the image forming apparatus.

To attain the above objects, in a second aspect of the present invention, there is provided an image forming apparatus capable of switching a print sequence between a double-sided print sequence in which both sides of a sheet are printed and a one-sided print sequence in which one side of a sheet is printed, comprising one-side data determining means for determining whether there is any print data to be printed on a second side of a sheet to be printed second in the both-sided print sequence, printing direction setting means for making settings to make uniform a printing direction between the both-sided print sequence and the one-sided print sequence, and printing control means for providing control such that printing is preformed in the one-sided print sequence when the one-side data determining means determines that there is no print data to be printed on the second side of the sheet and the printing direction setting means has made settings to make uniform the printing direction, and printing is performed in the both-sided print sequence in other cases.

Preferably, the image forming apparatus according to the second aspect comprises completion determination means for determining whether printing of a last page has been completed.

To attain the above objects, in a third aspect of the present invention, there is provided an image forming apparatus capable of switching a print sequence between a double-sided print sequence in which both sides of a sheet are printed and a one-sided print sequence in which one side of a sheet is printed, comprising number-of-pages determining means for determining whether a total number of pages to be printed is even or odd, printing direction setting means for making settings to make uniform a printing direction between the both-sided print sequence and the one-sided print sequence, and printing control means for providing control such that printing is performed in the one-sided print sequence even when the number-of-print pages determining means determines that the total number of pages to be printed is odd and the printing direction setting means has made settings to make uniform the printing direction.

Preferably, the image forming apparatus according to the third aspect comprises last page determining means for determining whether a page to be printed is a last page, and inverting means for inverting a print image in a vertical direction, and wherein the printing control means provides control such that a print image on a last page is inverted in the vertical direction by the inverting means and is printed in the one-sided print sequence when the number-of-print pages determining means determines that the total number of pages to be printed is odd, the last page determining means determines that the page to be printed is the last page, and the printing direction setting means has made the settings to make uniform the printing direction.

To attain the above objects, in a fourth aspect of the present invention, there is provided an image forming apparatus capable of switching a print sequence between a double-sided print sequence in which both sides of a sheet are printed and a one-sided print sequence in which one side of a sheet is printed, comprising one-side data determining means for determining whether there is any print data to be printed on a second side of a sheet to be printed second in the both-sided print sequence, and printing control means for providing control such that printing of the sheet to be printed second is performed in the one-sided print sequence when the one-side data determining means determines that there is no print data to be printed on the second side of the sheet.

Preferably, the image forming apparatus according to the fourth aspect comprises printing direction setting means for making settings to make uniform a printing direction between the both-sided print sequence and the one-sided print sequence, and inverting means for inverting a print image in a vertical direction, and wherein the printing control means provides control such that a print image on a present page is inverted in the vertical direction by the inverting means and is printed in the one-sided print sequence when the one-sided printing control means determines that there is no print data to be printed on the second side of the sheet and the printing direction setting means has made the settings to make uniform the printing direction.

To attain the above objects, in a fifth aspect of the present invention, there is provided a method of controlling an image forming apparatus capable of switching a print sequence between a double-sided print sequence in which both sides of a sheet are printed and a one-sided print sequence in which one side of a sheet is printed, comprising a number-of-print pages determining step of determining whether a total number of pages to be printed is even or odd, and a printing control step of providing control such that printing of all pages is performed in the both-sided print sequence when it is determined in the number-of-print pages determining step that the total number of pages to be printed is odd and settings have been made to make uniform a printing direction between the both-sided print sequence and the one-sided print sequence.

To attain the above objects, in a sixth aspect of the present invention, there is provided a method of controlling an image forming apparatus capable of switching a print sequence between a double-sided print sequence in which both sides of a sheet are printed and a one-sided print sequence in which one side of a sheet is printed, comprising a one-side data determining step of determining whether there is any print data to be printed on a second side of a sheet to be printed second in the both-sided print sequence, and a printing control step of providing control such that printing is preformed in the one-sided print sequence when it is determined in the one-side data determining step that there is no print data to be printed on the second side of the sheet and no settings have been made to make uniform a printing direction between the both-sided print sequence and the one-sided print sequence and printing is performed in the both-sided print sequence in other cases.

To attain the above objects, in a seventh aspect of the present invention, there is provided a method of controlling an image forming apparatus capable of switching a print sequence between a double-sided print sequence in which both sides of a sheet are printed and a one-sided print sequence in which one side of a sheet is printed, comprising a number-of-print pages determining step of determining whether a total number of pages to be printed is even or odd, and a printing control step of providing control such that printing is performed in the one-sided print sequence even when it is determined in the number-of-print pages determining step that the total number of pages to be printed is odd and settings have been made to make uniform a printing direction between the both-sided print sequence and the one-sided print sequence.

To attain the above objects, in an eighth aspect of the present invention, there is provided a method of controlling an image forming apparatus capable of switching a print sequence between a double-sided print sequence in which both sides of a sheet are printed and a one-sided print sequence in which one side of a sheet is printed, comprising a one-side data determining step of determining whether there is any print data to be printed on a second side of a sheet to be printed second in the both-sided print sequence, and a printing control step of providing control such that printing of the sheet to be printed second is preformed in the one-sided print sequence when it is determined in the one-side data determining step that there is no print data to be printed on the second side of the sheet.

To attain the above objects, in a ninth aspect of the present invention, there is provided a computer-readable storage medium storing a program for executing a method of controlling an image forming apparatus capable of switching a print sequence between a double-sided print sequence in which both sides of a sheet are printed and a one-sided print sequence in which one side of a sheet is printed, the method comprising a number-of-print pages determining step of determining whether a total number of pages to be printed is even or odd, and a printing control step of providing control such that printing of all pages is performed in the both-sided print sequence when it is determined in the number-of-print pages determining step that the total number of pages to be printed is odd and settings have been made to make uniform a printing direction between the both-sided print sequence and the one-sided print sequence.

To attain the above objects, in a tenth aspect of the present invention, there is provided a computer-readable storage medium storing a program for executing a method of controlling an image forming apparatus capable of switching a print sequence between a double-sided print sequence in which both sides of a sheet are printed and a one-sided print sequence in which one side of a sheet is printed, the method comprising a one-side data determining step of determining whether there is any print data to be printed on a second side of a sheet to be printed second in the both-sided print sequence, and a printing control step of providing control such that printing is preformed in the one-sided print sequence when it is determined in the one-side data determining step that there is no print data to be printed on the second side of the sheet and no settings have been made to make uniform a printing direction between the both-sided print sequence and the one-sided print sequence and printing is performed in the both-sided print sequence in other cases.

To attain the above objects, in an eleventh aspect of the present invention, there is provided a computer-readable storage medium storing a program for executing a method of controlling an image forming apparatus capable of switching a print sequence between double-sided print sequence in which both sides of a sheet are printed and a one-sided print sequence in which one side of a sheet is printed, the method comprising a number-of-print pages determining step of determining whether a total number of pages to be printed is even or odd, and a printing control step of providing control such that printing is performed in the one-sided print sequence even when it is determined in the number-of-print pages determining step that the total number of pages to be printed is odd and settings have been made to make uniform a printing direction between the both-sided print sequence and the one-sided print sequence.

To attain the above objects, in a twelfth aspect of the present invention, there is provided a computer-readable storage medium storing a program for executing a method of controlling an image forming apparatus capable of switching a print sequence between a double-sided print sequence in which both sides of a sheet are printed and a one-sided print sequence in which one side of a sheet is printed, the method comprising a one-side data determining step of determining whether there is any print data to be printed on a second side of a sheet to be printed second in the both-sided print sequence, and a printing control step of providing control such that printing of the sheet to be printed second is preformed in the one-sided print sequence when it is determined in the one-side data determining step that there is no print data to be printed on the second side of the sheet.

To attain the above objects, in a thirteenth aspect of the present invention, there is provided a program supplied to an image forming apparatus capable of switching a print sequence between a double-sided print sequence in which both sides of a sheet are printed and a one-sided print sequence in which one side of a sheet is printed, the program comprising a number-of-print pages determining module for determining whether a total number of pages to be printed is even or odd, and a printing control module for providing control such that printing of all pages is performed in the both-sided print sequence when it is determined by the number-of-print pages determining module that the total number of pages to be printed is odd and settings have been made to make uniform a printing direction between the both-sided print sequence and the one-sided print sequence.

To attain the above objects, in a fourteenth aspect of the present invention, there is provided a program supplied to an image forming apparatus capable of switching a print sequence between a double-sided print sequence in which both sides of a sheet are printed and a one-sided print sequence in which one side of a sheet is printed, the program comprising a one-side data determining module for determining whether there is any print data to be printed on a second side of a sheet to be printed second in the both-sided print sequence, and a printing control module for providing control such that printing is preformed in the one-sided print sequence when it is determined by the one-side data determining module that there is no print data to be printed on the second side of the sheet and no settings have been made to make uniform a printing direction between the both-sided print sequence and the one-sided print sequence and printing is performed in the both-sided print sequence in other cases.

To attain the above objects, in a fifteenth aspect of the present invention, there is provided a program supplied to An image forming apparatus capable of switching a print sequence between a double-sided print sequence in which both sides of a sheet are printed and a one-sided print sequence in which one side of a sheet is printed, the program comprising a number-of-print pages determining module for determining whether a total number of pages to be printed is even or odd, and a printing control module for providing control such that printing is performed in the one-sided print sequence even when it is determined by the number-of-print pages determining module that the total number of pages to be printed is odd and settings have been made to make uniform a printing direction between the both-sided print sequence and the one-sided print sequence.

To attain the above objects, in a sixteenth aspect of the present invention, there is provided a program supplied to An image forming apparatus capable of switching a print sequence between a double-sided print sequence in which both sides of a sheet are printed and a one-sided print sequence in which one side of a sheet is printed, comprising a one-side data determining module for determining whether there is any print data to be printed on a second side of a sheet to be printed second in the both-sided print sequence, and a printing control module for providing control such that printing of the sheet to be printed second is preformed in the one-sided print sequence when it is determined by the one-side data determining module that there is no print data to be printed on the second side of the sheet.

To attain the above objects, in a seventeenth aspect of the present invention, there is provided a image forming apparatus capable of performing double-sided printing of a job comprised of a plurality of pages, comprising a processor that executes printing in a first mode in which a predetermined page in a job for which a both-sided print mode has been designated and all pages included in the job other than the predetermined page are processed in a both-sided print sequence, and in a second mode in which pages other than the predetermined page included in the job for which the both-sided print mode has been designated are processed in the both-sided print sequence and the predetermined page is processed in a one-sided print sequence, and a controller that provides control such that the processor executes printing selectively in the first mode or in the second mode.

Preferably, in the seventeenth aspect of the present invention, the controller provides control such that the processor executes printing in one of the first mode and the second mode according to information on printing conditions of the job including at least information for determining whether a total number of pages included in the job is odd or even.

More preferably, in the seventeenth aspect of the present invention, the controller provides control such that the processor executes printing in the first mode when the total number of pages included in the job is even, and in the second mode when the total number of pages included in the job is odd.

Preferably, in the seventeenth aspect of the present invention, the processor is capable of executing printing on a sheet selected from sheets of a plurality of types including a sheet of a predetermined type, and the controller provides control such that the processor executes printing in one of the first mode and the second mode according to the information on the printing conditions of the job including at least information for determining whether the sheet of the predetermined type is to be used in the job.

More preferably, in the seventeenth aspect of the present invention, the sheet of the predetermined type includes at least one of a prepunched sheet on which a punching process is performed in advance, and a preprinted sheet on which a printing process is performed in advance.

Preferably, in the seventeenth aspect of the present invention, the controller provides control such that the processor executes printing in the first mode when the sheet of the predetermined type is to be used in the job, and in the second mode when the sheet of a type other than the predetermined type is to be used in the job.

Preferably, in the seventeenth aspect of the present invention, the controller provides control such that the processor executes printing in one of the first mode and the second mode according to the information on the printing conditions of the job including at least information for determining whether an even-numbered page included in the job is a blank page.

More preferably, in the seventeenth aspect of the present invention, the controller provides control such that the processor executes printing in the first mode when an even-numbered page included in the job is a blank page, and in the second mode when an even-numbered page included in the job is not a blank page.

Preferably, in the seventeenth aspect of the present invention, the controller provides control such that the processor executes printing in one of the first mode and the second mode according to information on printing conditions of the job including information for determining whether an image formation mode in which a printing direction is required to be made uniform, including at least one of a prepunched sheet mode in which a prepunched sheet is printed and a preprint mode in which a preprinted sheet is printed, is designated for the job.

More preferably, in the seventeenth aspect of the present invention, the controller provides control such that the processor executes printing in the first mode when the prepunched sheet mode or the preprinted sheet mode as the image formation mode is designated for the job, and in the second mode when neither the prepunched sheet mode nor the preprint mode is designated for the job.

Still more preferably, in the seventeenth aspect of the present invention, the controller provides control such that the processor executes printing in the first mode when a total number of pages included in the job is odd and the print sheet of the predetermined type is to be used in the job, and in the second mode when the total number of pages included in the job is odd and a sheet other than the sheet of the predetermined type is to be used in the job.

Preferably, in the seventeenth aspect of the present invention, the controller provides control such that the processor executes printing in the first mode when a predetermined image formation mode, in which a printing direction is required to be made uniform, including at least one of a prepunched sheet mode in which a prepunched sheet is printed and a preprint mode in which a preprinted sheet is printed, is designated for the job and an odd total number of pages is included in the job, and in the second mode when the predetermined image formation mode is not designated for the job and an odd total number of pages is included in the job.

Preferably, in the seventeenth aspect of the present invention, the predetermined page is a last page of the job.

Alternatively, in the seventeenth aspect of the present invention, the predetermined page is an even-numbered page of the job.

To attain the above objects, in an eighteenth aspect of the present invention, there is provided a method of controlling an image forming apparatus capable of performing both-sided printing on a job comprising a plurality of pages, comprising a control step of causing a processor to execute printing selectively in a first mode in which a predetermined page in a job for which a both-sided print sequence has been designated and all pages included in the job other than the predetermined page are processed in a both-sided print sequence, and in a second mode in which pages other than the predetermined page included in the job for which the both-sided print sequence is designated are processed in a both-sided print sequence and the predetermined page is processed in a one-sided print sequence.

To attain the above objects, in a nineteenth aspect of the present invention, there is provided a computer-readable storage medium storing a program for causing an image forming apparatus capable of performing double-sided printing of a job comprising a plurality of pages to execute a control step of causing a processor to execute printing selectively in a first mode in which a predetermined page in a job for which a both-sided print sequence has been designated and all pages included in the job other than the predetermined page are processed in a both-sided print sequence, and in a second mode in which pages other than the predetermined page included in the job for which the both-sided print sequence is designated are processed in a both-sided print sequence and the predetermined page is processed in a one-sided print sequence.

The above and other objects, features, and advantages of the invention will become more apparent from the following detailed description taken in connection with the accompanying with drawings.

DETAILED DESCRIPTION OF THE PREFERRED EMBODIMENTS

The summary of the present invention will be described first. According to preferred embodiments of the present invention described below, in the case where a problem is caused by a difference in printing direction in both-sided printing in an image forming apparatus having a mechanism that switches the print sequence between a both-sided print sequence and a one-sided print sequence, such control is provided that the print sequence is inhibited from being switched from the both-sided print sequence to the one-sided print sequence to thereby make uniform the printing directions of all pages, lower the sheet jamming frequency, and reduce the wear of component parts. The present invention will now be described in detail with reference to the accompanying drawings showing the preferred embodiments thereof.

Figure 1:
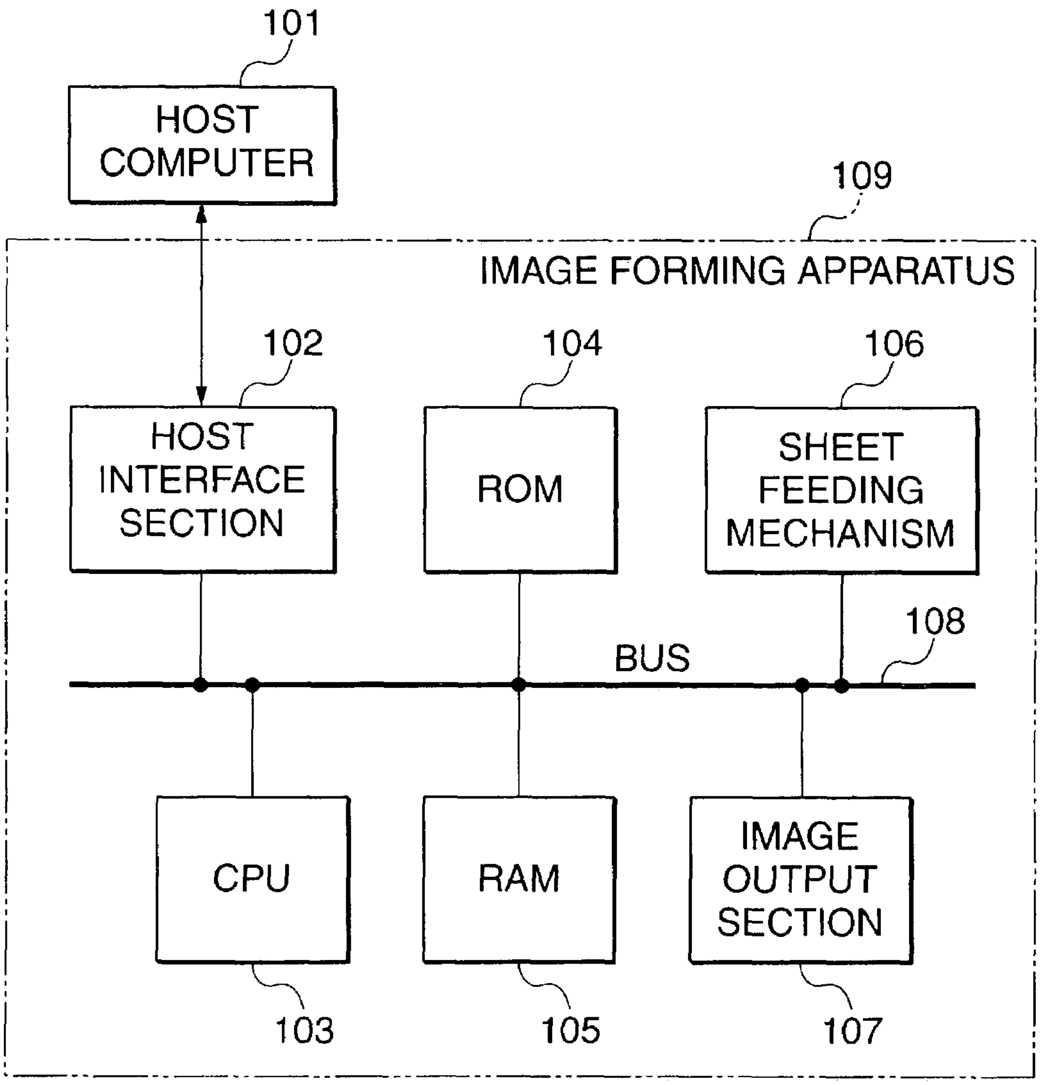
FIG. 1 is a block diagram showing the arrangement of a control system of an image forming apparatus according to first to fourth embodiments of the present invention.

FIG. 1 is a block diagram showing the arrangement of a control system of an image forming apparatus according to a first embodiment of the present invention. An image forming apparatus 109 is comprised of a host interface section 102, a CPU 103, a ROM 104, a RAM 105, a sheet feeding mechanism 106, an image output section 107, and a bus 108. In FIG. 1, reference numeral 101 denotes a host computer as an information processing apparatus that is connected to the image forming apparatus 109 such that it may perform data communications with the image forming apparatus 109.

In further detail, the host computer 101 produces a document, and sends a document print request to the image forming apparatus 109. In the image forming apparatus 109, the host interface section 102 is implemented by a serial interface circuit, parallel interface circuit, or LAN interface circuit, and transmits the document print request from the host computer 101 to the CPU 103. The host interface section 102 transmits information from the image forming apparatus 109 to the host computer 101. The ROM 104 stores control programs for controlling the operations of component parts. The RAM 105 stores control programs as well as print images transmitted from the host computer 101 to the image forming apparatus 109.

The image output section 107 forms a print image, which is stored in the RAM 105, on a photosensitive drum by scanning via laser beam. In response to the formation of the print image on the photosensitive drum, the sheet feeding mechanism 106 conveys a sheet by controlling sheet conveying rollers disposed in some places of a sheet conveyance system. The sheet is conveyed to a transfer position of the photosensitive drum on which the print image is formed, so that the image is transferred onto the sheet to complete printing. The CPU 103 controls the operations of these component parts according to control programs stored in the ROM 104. The CPU 103 carries out processes shown in flow charts described later according to the control programs. The bus 108 is for connecting the component parts of the image forming apparatus 109 to each other, and serves as a communication path.

Figure 2:
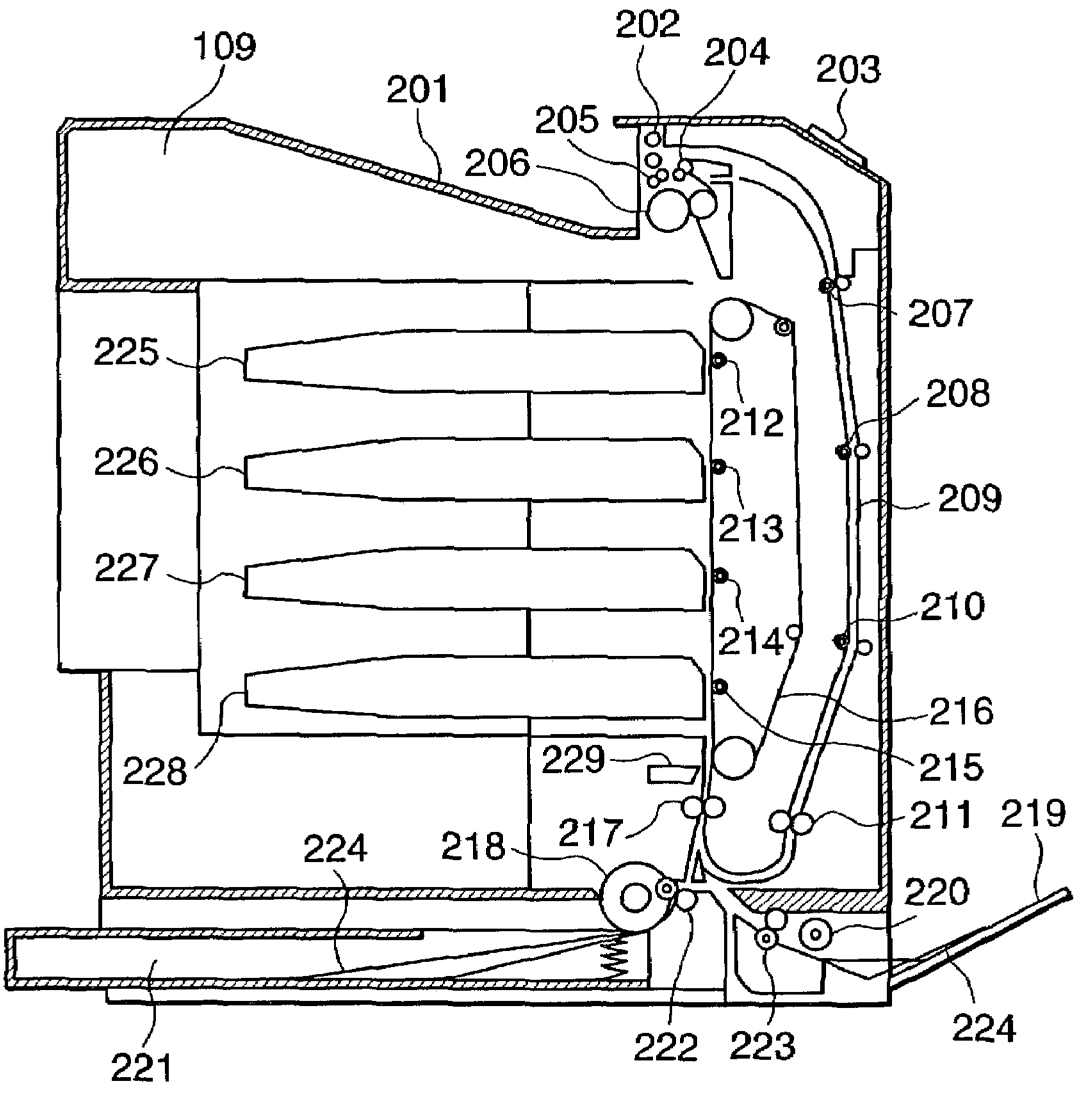
FIG. 2 is a schematic diagram showing the interior structure of the image forming apparatus according to the first to fourth embodiments.

FIG. 2 is a schematic diagram showing the interior structure of the image forming apparatus 109 according to the first embodiment. The body of the image forming apparatus 109 is comprised of a sheet discharge tray 201; a both-sided printing conveying path switching roller 202 that doubles as a sheet discharge roller; an operation panel 203; a conveying roller 204; a sheet discharge sensor 205; a fixing device 206; both-sided conveying rollers 207, 208, 210, and 211; a both-sided printing conveying path 209; rotary rollers 212, 213, 214, and 215; a sheet conveying belt 216; an absorbing roller 217; a cassette clutch 218; a manual feed tray 219; a manual feed clutch 220; a sheet cassette 221; a sheet feed roller 222, a manual sheet feed roller 223; image recording sections 225, 226, 227, and 228; and a resist shutter 229.

In further detail, the operation panel 203 is provided with switches for the user to enter a variety of instructions and an LED display, LCD display, or the like for displaying messages and settings relating to the image forming apparatus 109. The sheet cassette 221 is for holding sheets (recording media) 224, and has a mechanism that electrically detects the sheet size by a partition, not shown. The cassette clutch 218 has a cam that picks up the top one of sheets 224 held in the sheet cassette 221 and conveys the picked-up sheet 224 to the sheet feed roller 222 via a driving force transmitted from drive means, not shown. This cam intermittently rotates in every sheet feeding action, and one sheet 224 is conveyed in response to one rotation of the cam.

The sheet feed roller 222 is for conveying the leading end of the sheet 224 to the resist shutter 229. The resist shutter 229 is capable of stopping feeding the sheet 224 by pressing the sheet 224. The manual feed tray 219 is for holding sheets that are fed manually. The manual feed clutch 220 is for conveying the leading end of the sheet 224 to the manual feed roller 223. The manual feed roller 223 is for conveying the leading end of the sheet 224 to the resist shutter 229. The sheet 224 for use in recording of an image is fed from one selected from the sheet cassette 221 and the manual feed tray 219.

Each of the image recording sections 225, 226, 227, and 228 includes a photosensitive drum, a toner holding section, and so forth, and forms a toner image on the sheet 224 by an electrophotographing process. Each of the image recording sections 225, 226, 227, and 228 has a laser scanner section incorporated therein to supply image information via laser beam. At the side of the image forming sections 225, 226, 227, and 228, the sheet conveying belt 216 for conveying the sheet 224 is stretched flat in a sheet conveying direction (upward from the lower side in FIG. 2) by the plurality of rotary rollers 212 to 215. At the upstream end of the sheet conveying belt 216, the absorbing roller 217 to which a bias is applied electrostatically absorbs the sheet 224 to the sheet conveying belt 216. In each of the image recording sections 225, 226, 227, and 228, an electrifying device and a developing device are disposed in such a way as to sequentially enclose the periphery of the photosensitive drum.

The fixing device 206 is for thermally fixing a toner image that has been formed on the sheet 224 by the image recording sections 225, 226, 227, and 228. The conveying roller 204 is for conveying the sheet 224 toward the sheet discharge tray 201. The sheet discharge sensor 205 is for detecting the discharge condition of the sheet 224. The both-sided printing conveying path switching roller 202 that doubles as the sheet discharge roller is for conveying the sheet 224 in a sheet discharge direction. If instructed to discharge the sheet 224, the both-sided printing conveying path switching roller 202 discharges the sheet 224 directly to the sheet discharge tray 201, and if instructed to perform duplex conveyance, the both-sided printing conveying path switching roller 202 switch backs the sheet 224 by reversing the rotational direction of the sheet 224 just after the trailing end of the sheet 224 passes the sheet discharge sensor 205, so that the sheet 224 is conveyed to the both-sided printing conveying path 209.

The both-sided printing conveying path 209 is for conveying the sheet 224 in both-sided printing. The sheet 224, which has been conveyed to the both-sided printing conveying path 209 in order to perform both-sided printing by the both-sided printing conveying path switching roller 202, is reconveyed to the resist shutter 229 by the both-sided conveying rollers 207, 208, 210, and 211, and then an instruction is waited to convey the sheet 224 to the image recording sections 225, 226, 227, and 228.

Figure 3:
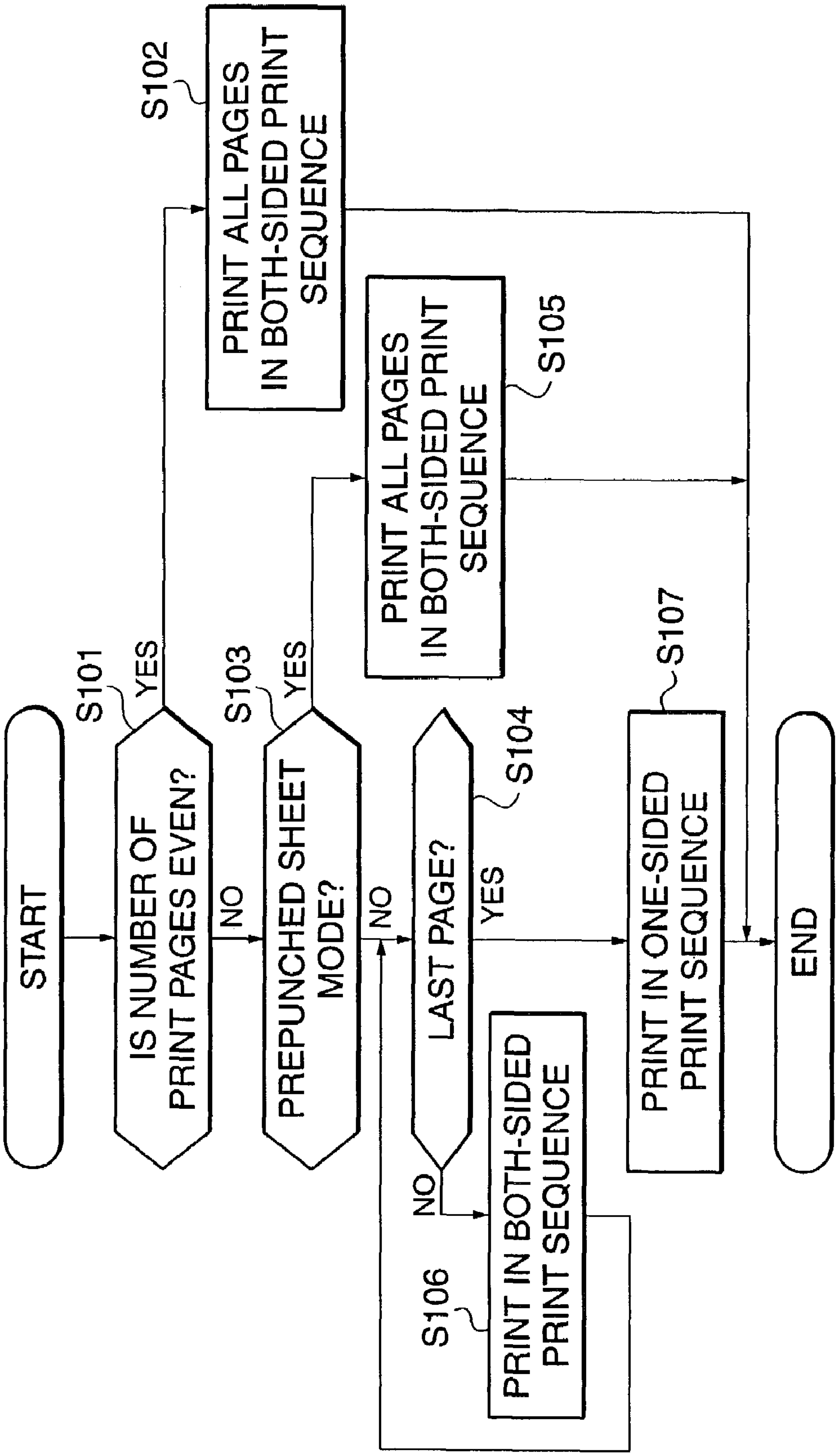
FIG. 3 is a flow chart showing the procedure for switching the print sequence between a double-sided print sequence and a one-sided print sequence according to the first embodiment.

Referring next to a flow chart of FIG. 3, a detailed description will be given of a both-sided printing process carried out by the image forming apparatus according to the first embodiment, which is constructed as described above. FIG. 3 is a flow chart showing the procedure for switching the print sequence between a both-sided print sequence and a one-sided print sequence during both-sided printing according to the first embodiment. The CPU 103 carries out the process shown in the flow chart of FIG. 3 according to the control programs stored in the ROM 104.

In the both-sided printing process shown in the flow chart of FIG. 3, the print sequence is switched between the both-sided print sequence and the one-sided print sequence according to the circumstances to unify the printing directions. FIG. 3 shows the procedure after the image forming apparatus receives data from the host computer and generates a print image. A "prepunched sheet mode", in which the printing direction of prepunched sheets punched in advance for binding sheets is made uniform between the both-sided printing and the one-sided printing, may be designated either by a printer driver of the host computer or by operation of the operation panel 203 of the image forming apparatus. The present invention may be applied to either method.

First, in a step S101, the CPU 103 of the image forming apparatus determines whether the total number of pages of print data received from the host computer via the host interface section 102 (i.e. the total number of pages included in one job) is even or odd. If it is determined in the step S101 that the total number of pages to be printed (hereinafter referred also as "print pages) is even, the process proceeds to a step S102 because there is no necessity of switching the print sequence between the both-sided print sequence and the one-sided print sequence. In the step S102, the CPU 103 causes the image recording sections to perform printing of all pages in the both-sided print sequence.

It should be noted that in the present embodiment, the "both-sided print sequence" means, for example, a sequence in which an image on the 2Nth page and an image on the (2N−1)th page of two-page original data are printed in this order on both sides of one recording sheet (if the number of pages to be printed is not less than three, a sequence in which data on the 2Nth page and the (2N−1)th page are printed in this order is repeated every two pages). Further, the "both-sided print sequence" means, for example, a sequence in which a sheet inverting action is included in a sequence of printing process steps including a sheet inverting action; e.g. a sequence in which a recording sheet with one recording surface thereof having been printed is inverted via a sheet inversion unit (including the both-sided printing conveying path 209), and the second side of the recording sheet is printed and the sheet is discharged. This sequence will now be described by way of a concrete example. If printing of all pages is performed in the both-sided print sequence in the case where four-page original data is printed on both sides of two recording sheets as one job, the procedure is as follows. An image on the second page is printed on one side of the first recording sheet. →The first recording sheet is inverted. →An image on the first page is printed on the other side of the first recording sheet. The first recording sheet is discharged. →An image on the fourth page is printed on one side of the second recording sheet. →The second recording sheet is inverted. →An image on the third page is printed on the other side of the second recording sheet. →The second recording sheet is discharged. In this way, the CPU 103 controls the operations of each unit. If it is determined in the step S101 that the total number of pages to be printed is odd, the process proceeds to a step S103 wherein the CPU 103 determines whether the prepunched sheet mode has been designated or not.

It should be noted that the "prepunched sheet mode" is a mode in which sheets having been subjected to a punching process (also referred to as "prepunched sheets") are used, and a printing process is performed on the prepunched sheets. To set the prepunched sheet mode, a sheet feed cassette containing prepunched sheets is selected using an item "select paper" among setting items on a print setting screen, not shown, for setting printing conditions, or the user selects "prepunched sheet" in designating the media type of sheets be printed. In this way, the prepunched sheet mode is designated and set as printing setting conditions. By ascertaining the printing setting conditions set by the user via the operating section, the CPU 103 determines in the step S103 whether the prepunched sheet mode has been designated or not. As information on each of a plurality of sheet feed cassettes of the image forming apparatus, information indicative of what type of sheets are stored in each sheet feed cassette (media size information on the size of sheets and media type information on the type of sheets) is stored in advance in a memory. By reading out and referring to the information stored in the memory, the CPU 103 determines what type of sheets are stored in which sheet feed cassette, to provide control such that sheets to be printed are selected according to the sheet feed cassette information, the setting conditions set by the user, and the like and such that printing is performed on sheets stored in the selected sheet feed cassette.

If it is determined in the step S103 that the prepunched sheet mode has been designated, the process proceeds to a step S105 wherein the CPU 103 causes the image recording sections to perform printing of all pages in the both-sided print sequence.

The processing in the step S105 provides control as follows. For example, if the total number of pages to be printed in one job is 5, the CPU 103 controls a printer section, the inversion unit, and so forth (including the both-sided printing conveying path 209) such that print images on the first to fourth pages are recorded one by one on the upper and lower sides of recording sheets in such a manner that print images on two pages are recorded on each recording sheet in the both-sided print sequence (including control of the printing order, inversion of the recording sheets, and so forth) (note that prepunched sheets are selected as recording sheets to be used as a result of the determination of the step S103). In this way, both-sided printing is performed on two recording sheets. A print image on the fifth page as the last page is then printed on the third recording sheet. On this occasion, printing of only one page is performed on the third recording sheet, but the CPU 103 performs printing in the both-sided print sequence as is the case with the other pages without executing the one-sided print sequence. In this case, the image on the fifth page is printed on one side of the third recording sheet, and the sheet inversion unit (including the both-sided printing conveying path 209) then inverts the third recording sheet. The third recording sheet is then discharged with one side thereof, on which the image on the fifth page has been printed, facing downward. In this way, in printing of the fifth page, the inversion unit inverts the recording sheet in the both-sided print sequence. As mentioned above, prepunched sheets are used as recording sheets in this sequence of recording. For this reason, printing of the last page included in the job comprised of the odd number of pages to be printed is performed in the both-sided print sequence as is the case with the other pages without executing the one-sided print sequence. This eliminates the possibility of a difference in punching position between the output result of the last page and the output results of the other pages, and obtains proper output results of all pages with the same image directions, printing directions, punching positions, and the like.

If it is determined in the step S103 that the prepunched sheet mode has not been designated, the process proceeds to a step S104 wherein the CPU 103 determines whether a page to be printed is the last page or not. If determining in the step S104 that the print page is not the last page, the CPU 103 then causes the image recording sections to perform printing of two pages (one sheet) in the both-sided print sequence. Upon completion of the printing, the process returns to the step S104 wherein the CPU 103 determines again whether a page to be printed is the last page or not. If it is determined in the step S104 that the page to be printed is the last page (there is only one page to be printed), the process proceeds to a step S107 wherein the CPU 103 causes the image recording sections to perform printing of the last page in the one-sided print sequence to complete printing.

A description will now be given of the "one-sided print sequence". The one-sided print sequence is different from the above described both-sided print sequence in that a print image on the (2N−1)th page and a print image on the 2Nth page are printed in this order (i.e. in order of pages from the top page). In processing of recording sheets in the one-sided print sequence, the printed recording sheets are discharged directly to the discharge section without being inverted by the sheet inversion unit.

The above described steps S104, S106, and S107 provide control as follows. For example, if the total number of pages to be printed in one job is 5, the CPU 103 controls the printer section, the inversion unit, and so forth (including the both-sided printing conveying path 209) such that respective print images on the first to fourth pages are recorded one by one on the upper and lower sides of recording sheets in such a manner that print images on two pages are recorded on each recording sheet (including control of the printing order, inversion of the recording sheets, and so forth) (note that recording sheets other than prepunched sheets are selected as recording sheets to be used as a result of the determination of the step S103). In this way, both-sided printing is performed for two recording sheets. A print image on the fifth page as the last page is then printed on the third recording sheet (other than a prepunched sheet). On this occasion, as is different from the above described control, the CPU 103 performs printing of the image on the fifth page in the one-sided print sequence in the step S107 without executing the both-sided print sequence as performed on the other pages. In this case, after the image on the fifth page is printed on one side of the third recording sheet, the sheet is discharged as it is, to the discharge tray outside the apparatus via the sheet conveying path without being inverted by the sheet inversion unit as in the above described case. This enables quick discharge of the output sheet to improve the productivity because the last page is printed in the one-sided print sequence, and lowers the probability of jamming or the like because a period of time required for the sheets to pass through the conveying path in the apparatus is reduced. Thus, it is possible to improve the productivity and prevent jamming.

Further, the present embodiment provides a sequence of control (first print mode) in which "all pages including the last page in one job are processed in the both-sided print sequence" by the above described step S105, and a sequence of control (second print mode) in which "other pages than the last page in one job including the last page are processed in the both-sided print sequence, and the last page is processed in the one-sided print sequence" by the above described step S107, and these sequences of control (both modes) can be executed selectively. The CPU 103 determines which sequence of control (mode) is to be executed according to the results of the determination in the steps S101 and S103. This improves the productivity and prevents jamming while eliminating the possibility of a difference in punching position among pages in the case where printing is performed on prepunched sheets and achieving proper output results of all pages with the same printing directions and punching positions. Thus, it is possible to improve the productivity and prevent jamming, and to obtain proper output results without difference in printing direction and the like.

A description will now be given of concrete examples of control provided by the above described process shown in the flow chart of FIG. 3 with reference to FIGS. 8 and 9.

Figure 8:
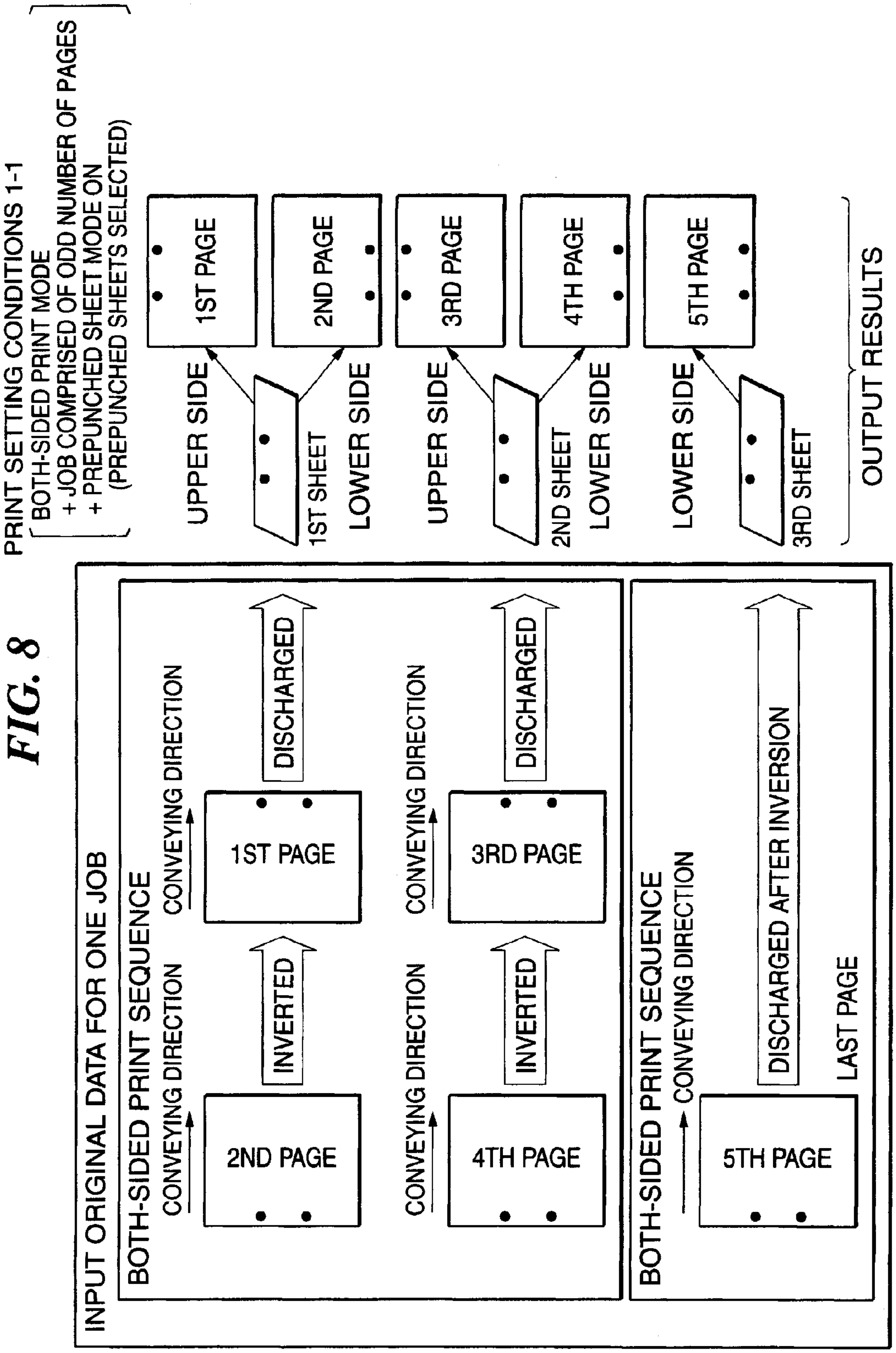
FIG. 8 is a view showing a concrete example of control according to the first embodiment.

FIG. 8 is a diagram showing an example of control and output results in the case where the user designates a both-sided print mode for a print job (one job) comprised of five-page document data, and prepunched sheets are selected as printing sheets by selection of the prepunched sheet mode or by selection of prepunched sheets in the paper selection mode.

As property information on the job subjected to printing, the CPU 103 acquires number-of-pages information for use in finding how many number of pages constitute the job. This information may be acquired through a number-of-originals counter, not shown, of the apparatus that counts the number of originals in an input job, or may be acquired based on the print property information supplied from a PC from which a job is inputted. Print setting information such as the image formation mode designated for the job is also acquired based on setting information set by the user and the like.

According to the above-mentioned information, the CPU 103 ascertains that the job is comprised of an odd number of pages, i.e. five pages, the both-sided print mode has been designated for the job, and sheets to be used as printing sheets for the job are prepunched sheets (the prepunched sheet mode has been selected as the image formation mode), and stores the information as the print setting conditions relating to the job (job information or property information) in the memory.

The CPU 103 then performs processing of the job based on the above described information according to the procedure shown in the flow chart of FIG. 3. Specifically, the CPU 103 performs printing of all pages in the job including the first to fourth original pages other than the last page and the last page in the both-sided print sequence (execution of the first mode). More specifically, as shown in FIG. 8, the CPU 103 provides control as follows. First, the first page and the second page are processed in the both-sided print sequence in which data on the first page and data on the second page are printed respectively on the upper side and the lower side of the first recording sheet in the above-mentioned printing order for the both-sided print sequence and the first recording sheet is inverted by the inversion unit. The third page and the fourth page are then processed in the both-sided print sequence in which data on the third page and data on the fourth page are respectively printed on the upper side and the lower side of the second recording sheet in the printing order for the both-sided above-mentioned print sequence and the recording sheet is inverted by the inversion unit. The fifth page as the last page is then processed in the both-sided print sequence in which data on the fifth page is printed on the third recording sheet and the recording sheet is inverted by the inversion unit.

The above described control obtains proper output results with the same printing direction and correct punching position as shown in FIG. 8.

A description will now be given of an example of control shown in FIG. 9. FIG. 9 is a diagram showing an example of control and output results in the case where the user designates the both-sided print mode for a print job (one job) comprised of five-page document data, and sheets (e.g. plain sheets) other than prepunched sheets are selected as sheets to be printed due to the user not selecting the prepunched sheet mode or the user selecting sheet other than prepunched sheets in the paper selection mode.

As in the example shown in FIG. 8, the CPU 103 acquires property information on the job subjected to printing, print setting information on settings made by the user, and the like. According to the acquired information, the CPU 103 ascertains that the job is comprised of an odd number of pages, i.e. five pages, the both-sided print sequence has been designated for the job, sheets to be used as printing sheets for the job are sheets (e.g. plain sheets) other than prepunched sheets (the prepunched sheet mode has not been selected as the image formation mode), and so forth, and stores the information as the print setting conditions relating to the job in the memory.

The CPU 103 then performs processing of the job based on the above described information according to the procedure show in the flow chart of FIG. 3. Specifically, the CPU 103 provides control such that printing processing is performed on data of the first to fourth pages other than the last page in the job in the both-sided print sequence and that printing processing is performed on data of the fifth page as the last page in the one-sided print sequence (execution of the second mode). More specifically, as shown in FIG. 9, the CPU 103 provides control as follows. First, the first page and the second page are processed in the both-sided print sequence in which data of the first page and data of the second page are respectively printed on the upper side and the lower side of the first recording sheet in the above-mentioned printing order for the both-sided print sequence and the first recording sheet is inverted by the inversion unit. The third page and the fourth page are then processed in the both-sided print sequence in which data of the third page and data of the fourth page are respectively printed on the upper side and the lower side of the second recording sheet in the above-mentioned printing order for the both-sided print sequence and the second recording sheet is inverted by the recording sheet by the inversion unit. The fifth page as the last page is then processed in the one-sided print sequence that includes a printing process in which data on the fifth page is printed on the third recording sheet and the third recording sheet is inhibited from being inverted by the inversion unit (i.e. the third recording sheet is discharged without being inverted by the inversion unit).

Figure 9:
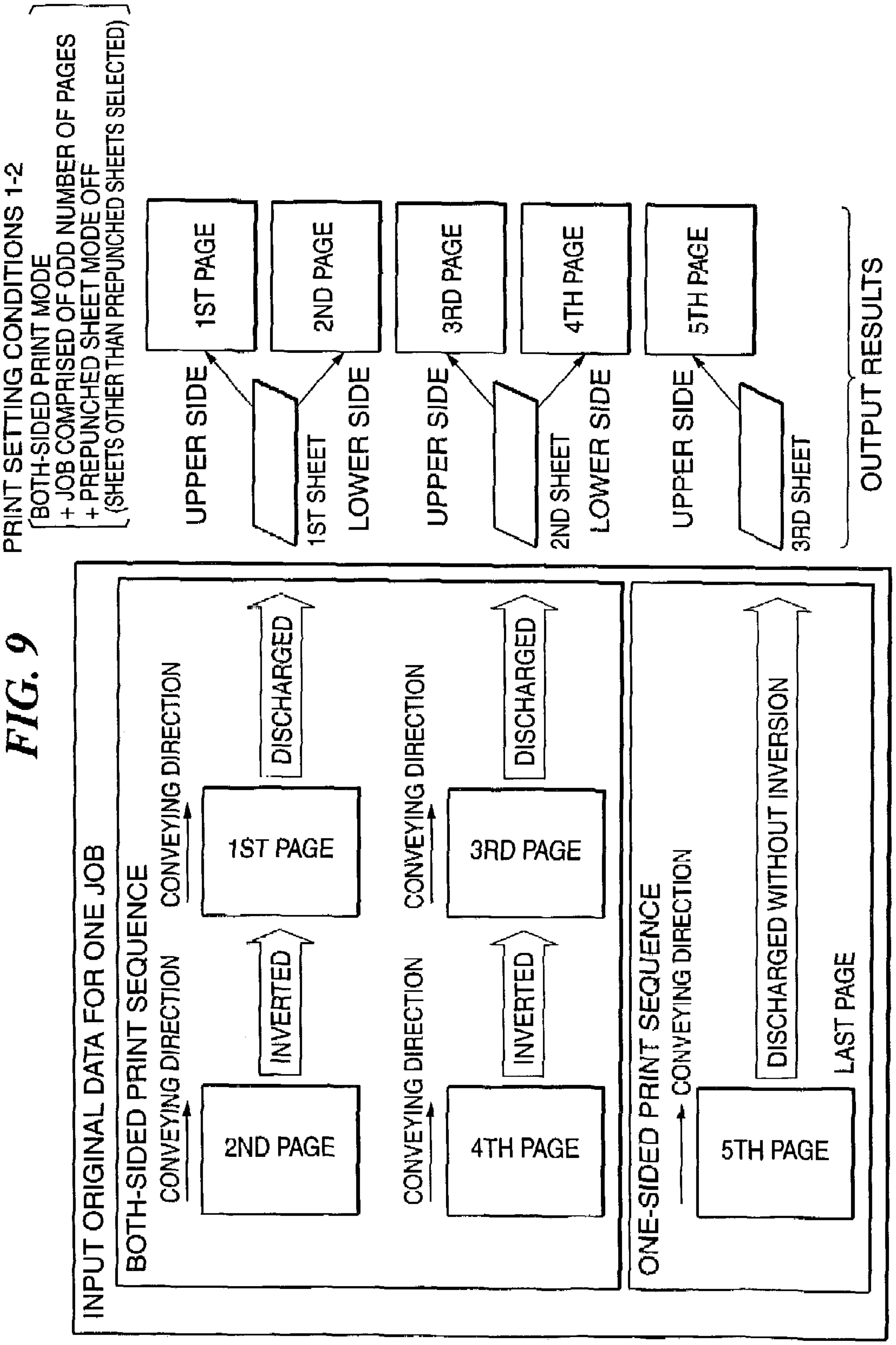
FIG. 9 is a view showing a concrete example of control according to the first embodiment.

The above described control obtains output results as shown in FIG. 9 and decreases the number of times, a period of time, and the number of opportunities that recording sheets pass through the inversion unit, thus reducing the output time and lowering the sheet jamming frequency. It should be noted that the recording sheets used in the example shown in FIG. 9 are not recording sheets such as prepunched sheets that are restricted in printing direction before printing, and therefore, there is no possibility of a difference in printing direction and the like. Therefore, it is possible to obtain proper output results.

As described above, the image forming apparatus according to the first embodiment is capable of designating the prepunched sheet mode in which printing of the last page in a print job is performed in the both-sided print sequence as is the case with the other pages even if the total number of pages to be printed is odd. This eliminates the problem that a difference in printing direction between the one-sided print sequence and the both-sided print sequence is caused by the mechanism of the image forming apparatus. On the other hand, if the prepunched sheet mode has not been designated, pages other than the last page in a print job are printed in the both-sided print sequence and the last page is printed in the one-sided print sequence. This prevents unnecessary sheet conveyance through the both-sided printing conveying path 209 to lower the jamming frequency and prevent wear of component parts.

A description will now be given of a second embodiment of the present invention. An image forming apparatus according to the second embodiment has the same arrangement of a control system (refer to FIG. 1) and the same schematic interior structure (refer to FIG. 2) as the image forming apparatus according to the first embodiment, and a description thereof is omitted.

In the first embodiment, the print sequence is switched from the both-sided print sequence to the one-sided print sequence only when the last page (a predetermined page in a print job) is printed in the case where the total number of pages to be printed is odd. In the second embodiment, every time printing of one sheet is completed, it is determined whether or not there is any print data to be printed on the second side of the next sheet. If it is determined that there is no print data to be printed on the second side of the next sheet and the prepunched sheet mode has not been designated, printing is performed in the one-sided print sequence. This is advantageous because unnecessary sheet conveyance can be prevented, for example, in the case where a blank page is included in a document for which the both-sided print sequence has been designated. In the above description, the case where there is no print data to be printed on the second side of the next sheet means a case where the present page is a blank page or the last page. It should be noted that the second side means the side that is printed second in the both-sided print sequence. For example, assuming that a print job is comprised of six-page print data, the second, fourth, and sixth pages (i.e. the 2Nth pages) correspond to sides that are printed second in each recording sheet. In this case, the first, third, and fifth pages (i.e. the (2N−1)th pages) correspond to the first sides that are printed first in each recording sheet.

Figure 4:
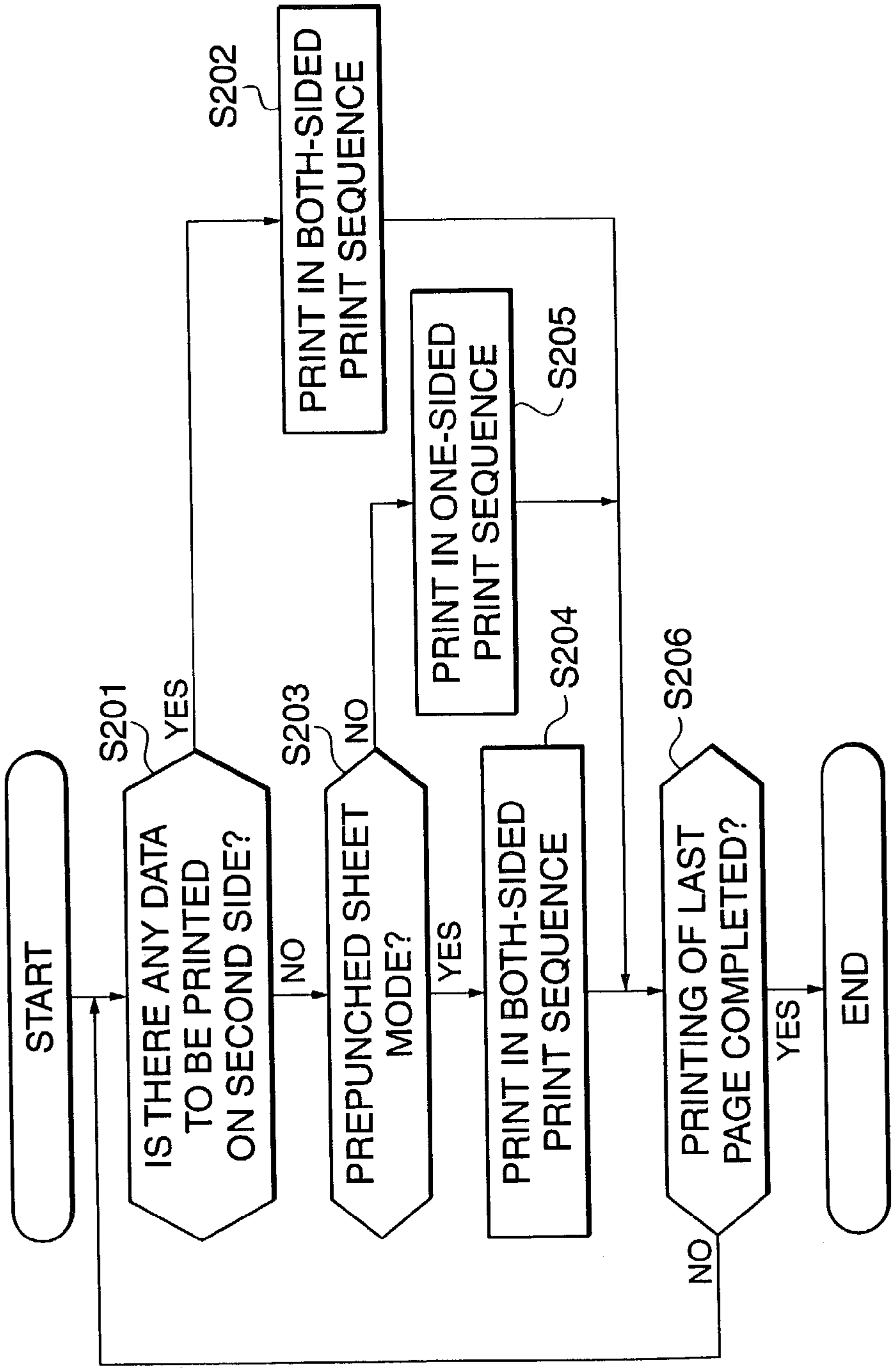
FIG. 4 is a flow chart showing the procedure for switching the print sequence between the double-sided print sequence and the one-sided print sequence according to the second embodiment.

Referring next to a flow chart of FIG. 4, a detailed description will now be given of a both-sided printing process carried out by the image forming apparatus according to the second embodiment, which is constructed as described above. FIG. 4 shows the procedure for switching the print sequence between the both-sided print sequence and the one-sided print sequence according to the second embodiment. The CPU 103 of the image forming apparatus carries out the process shown in the flow chart of FIG. 4 according to the control programs stored in the ROM 104.

First, in a step S201, the CPU 103 of the image forming apparatus determines whether or not there is any print data to be printed on the second side of a sheet to be printed. If it is determined in the step S201 that there is print data to be printed on the second sheet of the sheet, the process proceeds to a step S202 wherein the CPU 103 causes the image recording sections to print the sheet in the both-sided print sequence. In this way, for example, in the case where an image on the (2N−1)th page and an image on the 2Nth page of a print job are respectively printed on the upper side and the lower side of the Nth recording sheet, the CPU 103 provides control such that printing of each page is performed in the both-sided print sequence.

If it is determined in the step S201 that there is no print data to be printed on the second side of the sheet (the side corresponding to the 2Nth page), the process proceeds to a step S203 wherein the CPU 103 determines whether the prepunched sheet mode has been designated or not in the same manner as in the step S103 of the first embodiment.

If it is determined in the step S203 that the prepunched sheet mode has been designated, the process proceeds to a step S205 wherein the CPU 103 causes the image recording sections to perform printing of all pages in the both-sided print sequence. The process in the step S205 provides control as follows. For example, even if there is no image data to be printed on the side corresponding to the 2Nth page (e.g. the 2Nth page is a blank page) in the case where image data of the (2N−1)th page and the 2Nth page in a print job are printed on both sides of the Nth recording sheet, the Nth recording sheet is printed in the both-sided print sequence because the recording sheet is the one selected by designation of the prepunched sheet mode (i.e. the prepunched sheet). In this example, there is no image on the 2Nth page. Thus, only the image data of the (2N−1)th page is printed on the Nth recording sheet without performing printing of the 2Nth page, but the recording sheet is inverted by the inversion unit in the both-sided print sequence.

If it is determined in the step S203 that the prepunched sheet mode has not been designated, the process proceeds to a step S205 wherein the CPU 103 causes the image recording sections to perform printing in the both-sided print sequence. The processing in the step S205 provides control as follows. For example, if there is no image data to be printed on the side corresponding to the 2Nth page (e.g. the 2Nth page is a blank page) in the case where image data of the (2N−1)th page and the 2Nth page of a print job is printed on both sides of the Nth recording sheet, only image data of the (2N−1)th page is printed on the Nth recording sheet, which is then discharged to the discharge tray outside the apparatus without going through the inversion unit (without being inverted by the inversion unit) in the one-sided print sequence, because the recording sheet is not the one selected by designation of the prepunched sheet mode (i.e. the recording sheet is not the prepunched sheet).

After printing of one sheet has been completed, the process proceeds to a step S206 wherein the CPU 103 determines whether printing of all pages up to the last page has been completed or not (whether processing on all recording sheets for one print job has been completed or not). If it is determined in the step S206 that printing of all pages up to the last page has not been completed, the process returns to the step S201 to perform the above described processing. For example, if one print job is comprised of six-page print data, the above described sequence of processing is repeated three times for three recording sheets because one recording sheet is comprised of two pages. If it is determined in the step S206 that printing of all pages up to the last page has been completed, the process is terminated.

As described above, according to the present embodiment, in the case where data on the (2N−1) page and data on the 2Nth page are printed on both recording sides of the Nth recording sheet, a sequence of control (third print mode) is provided such that "the Nth recording sheet is printed in the both-sided print sequence even if there is no data to be printed on the 2Nth page", and a sequence of control (fourth print mode) is provided such that "the Nth recording sheet is printed in the one-sided print sequence even if there is no data (i.e. blank page) to be printed on the 2Nth page". These sequences of control (both modes) can be executed selectively. The CPU 103 determines which sequence of control (mode) is to be executed according to the result of the determination in the step S203

A description will now be given of concrete examples of control provided by the above described process shown in the flow chart of FIG. 4 with reference to FIGS. 10 and 11.

Figure 10:
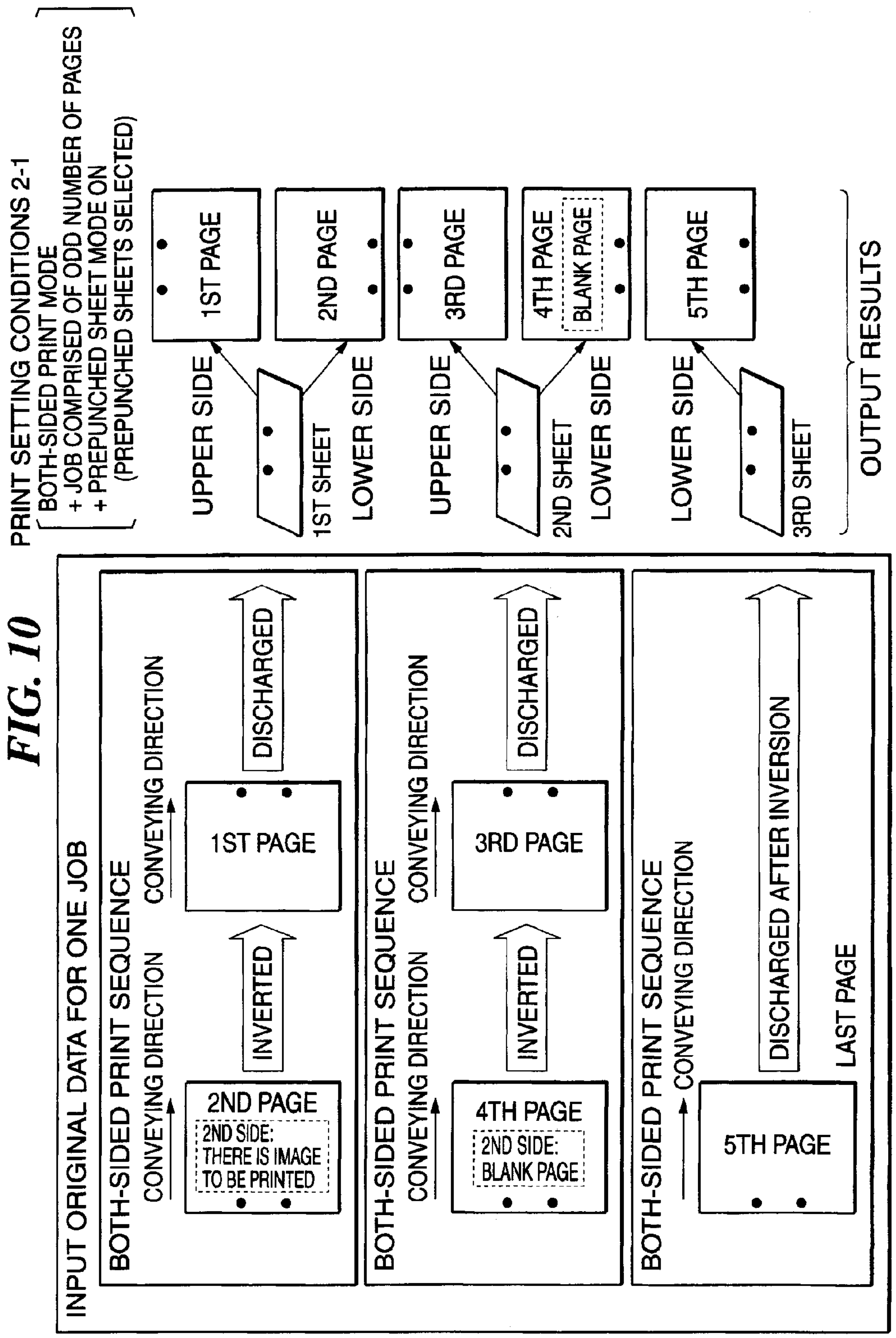
FIG. 10 is a view showing a concrete example of control according to the second embodiment.

FIG. 10 is a diagram showing an example of control and output results in the case where the user designates the both-sided print mode for a print job (one job) comprised of five-page document data in which the fourth page has blank data and prepunched sheets are selected as sheets to be printed by selection of the prepunched sheet mode or by selection of prepunched sheets in the paper selection mode.

As in the first embodiment shown in FIG. 8, the CPU 103 acquires property information on the job subjected to printing, print setting information on settings made by the user, and so forth. It should be noted that the CPU 103 is capable of recognizing whether there is any blank page in the job and which page is a blank page according to the property information. According to the above-mentioned information, the CPU 103 ascertains that the job is comprised of an odd number of pages, i.e. five pages, the both-sided print sequence has been designated for the job, the fourth page has blank data (no image), and sheets to be used as printing sheets for the job are prepunched sheets, and stores the information as the print setting conditions relating to the job in the memory.

The CPU 103 then performs processing of the job based on the above described information according to the procedure shown in the flow chart of FIG. 4. Specifically, as shown in FIG. 10, the CPU 103 provides control as follows. First, the first page and the second page are processed in the both-sided print sequence in which data on the first page and data on the second page are respectively printed on the upper side and the lower side of the first recording sheet in the above-mentioned printing order used for the both-sided print sequence and the inversion unit inverts the first recording sheet. Then, the second recording sheet is printed. In this case, since the fourth page corresponding to the second side of the second recording sheet is a blank page but the second recording sheet is a prepunched sheet, the third page and the fourth page are then processed in the both-sided print sequence in which data on the third page is printed on the upper side of the second recording sheet and the inversion unit inverts the second recording sheet (that is, when the second recording sheet is printed, only data on the third page is printed on the first side of the recording sheet without printing the second side of the recording sheet because the fourth page is a blank page). Then, in printing the third recording sheet, the fifth page as the last page data is processed in the both-sided print sequence in which data on the fifth page is printed on the third recording sheet and the inversion unit then inverts the third recording sheet (execution of the third mode).

The above described control obtains consistent output results with the same printing direction and proper punching position as shown in FIG. 10 even if a blank page is included in a print job.

A description will now be given of an example of control shown in FIG. 11. FIG. 11 is a diagram showing an example of control and output results in the case where the user designates the both-sided print mode for a print job (one job) comprised of five-page document data and sheets (e.g. plain sheets) other than prepunched sheets are selected as sheets to be printed due to the user not selecting the prepunched sheet mode or the user selecting sheets other than prepunched sheets in the paper selection mode.

As in the example shown in FIG. 10, the CPU 103 acquires property information on the job subjected to printing, print setting information on settings made by the user, and the like. According to the information, the CPU 103 ascertains that the job is comprised of an odd number of pages, i.e. five pages, the both-sided print sequence has been designated for the job, the fourth page has blank data (no image), and sheets to be used as printing sheets for the job are sheets (e.g. plain sheets) other than prepunched sheets, and stores the information as the print setting conditions relating to the job in the memory.

The CPU 103 then performs processing of the job based on the above described information according to the procedure shown in the flow chart of FIG. 4. Specifically, as shown in FIG. 11, the CPU 103 provides control as follows. First, in printing the first recording sheet, since the second page corresponding to the second side of the first recording sheet is not a blank page (an image-formed page), the first page and the second page are processed in the both-sided print sequence which includes a printing process in which data on the first page and data on the second page are respectively printed on the upper side and the lower side of the first recording sheet in the above-mentioned printing order used for the both-sided print sequence and an inverting process in which the inversion unit then inverts the first recording sheet. Then, in printing the second recording sheet, since the fourth page corresponding to the second side of the second recording sheet is a blank page and the second recording sheet is not a prepunched sheet, the third page and the fourth page are then processed in the one-sided print sequence in which data on the third page is printed on the first side of the second recording sheet and the second recording sheet is then discharged without being inverted by the inversion unit (that is, when the second recording sheet is printed, printing is not performed for the second side of the recording sheet because the fourth page is a blank page). The fifth page as the last page data is then processed in the one-sided print sequence in which data on the fifth page is printed on the first side of the third recording sheet and the third recording sheet is discharged without being inverted by the inversion unit (execution of the forth mode).

Figure 11:
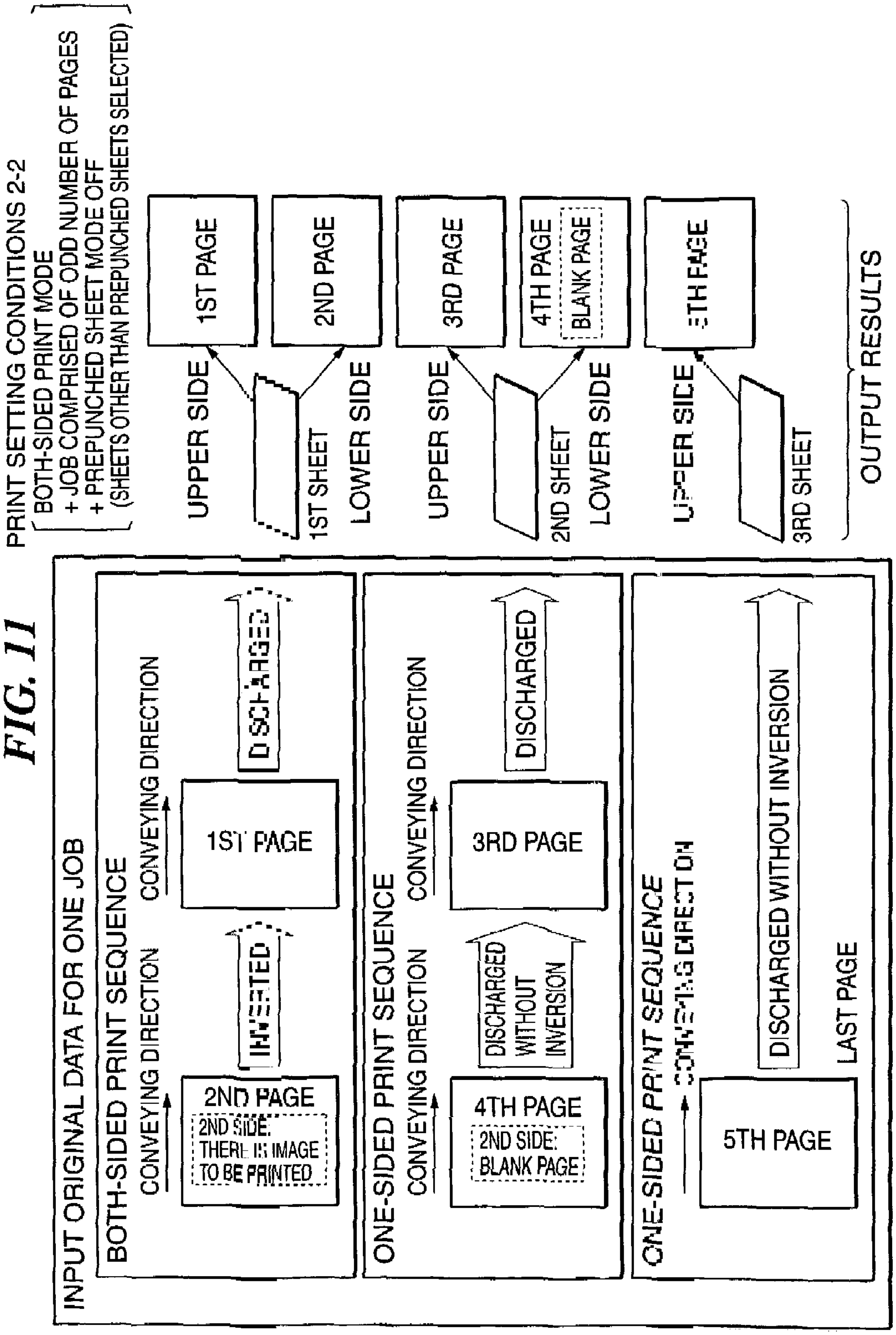
FIG. 11 is a view showing a concrete example of control according to the second embodiment.

The above described control obtains output results as shown in FIG. 11 and decreases the number of times, a period of time, and the number of opportunities that recording sheets pass through the inversion unit, thus reducing the output time and the jamming frequency. Further, it is possible to achieve both the effects of the third mode and the effects of the fourth mode.

As described above, according to the second embodiment, if there is no data to be printed on the second side of a sheet (corresponding to not only the last page but the 2Nth page for the Nth recording sheet), the sheet is printed in the one-sided print sequence on condition that the type of the sheet is other than the sheet type selected by designation of the prepunched sheet mode. Thus, although there is the necessity of determining whether or not there is any data to be printed on a sheet every time one sheet is printed, the second embodiment can further lower the sheet jamming frequency and prevent wear of component parts as compared with the first embodiment while achieving the effects of the first embodiment. If the prepunched sheet mode is designated, a sheet subjected to processing is printed in the both-sided print sequence even in the case where there is no print data to be printed on the second side of the sheet (corresponding to the 2Nth page for the Nth recording sheet), to thereby prevent a difference in printing direction.

A description will now be given of a third embodiment of the present invention. An image forming apparatus according to the second embodiment has the same arrangement of a control system (refer to FIG. 1) and the same schematic interior structure (refer to FIG. 2) as the image forming apparatus according to the first embodiment, and a description thereof is therefore omitted.

According to the first and second embodiments described above, in the case where the prepunched sheet mode is designated (i.e. in the case where there is the problem of a difference in printing direction), the print sequence is inhibited from being switched from the both-sided print sequence to the one-sided print sequence to overcome the problem. According to the third embodiment, in the case where the prepunched sheet mode is designated, a difference in printing direction is prevented by inverting a print image on the last page in the vertical direction and printing the inverted print image in the one-sided print sequence.

Figure 5:
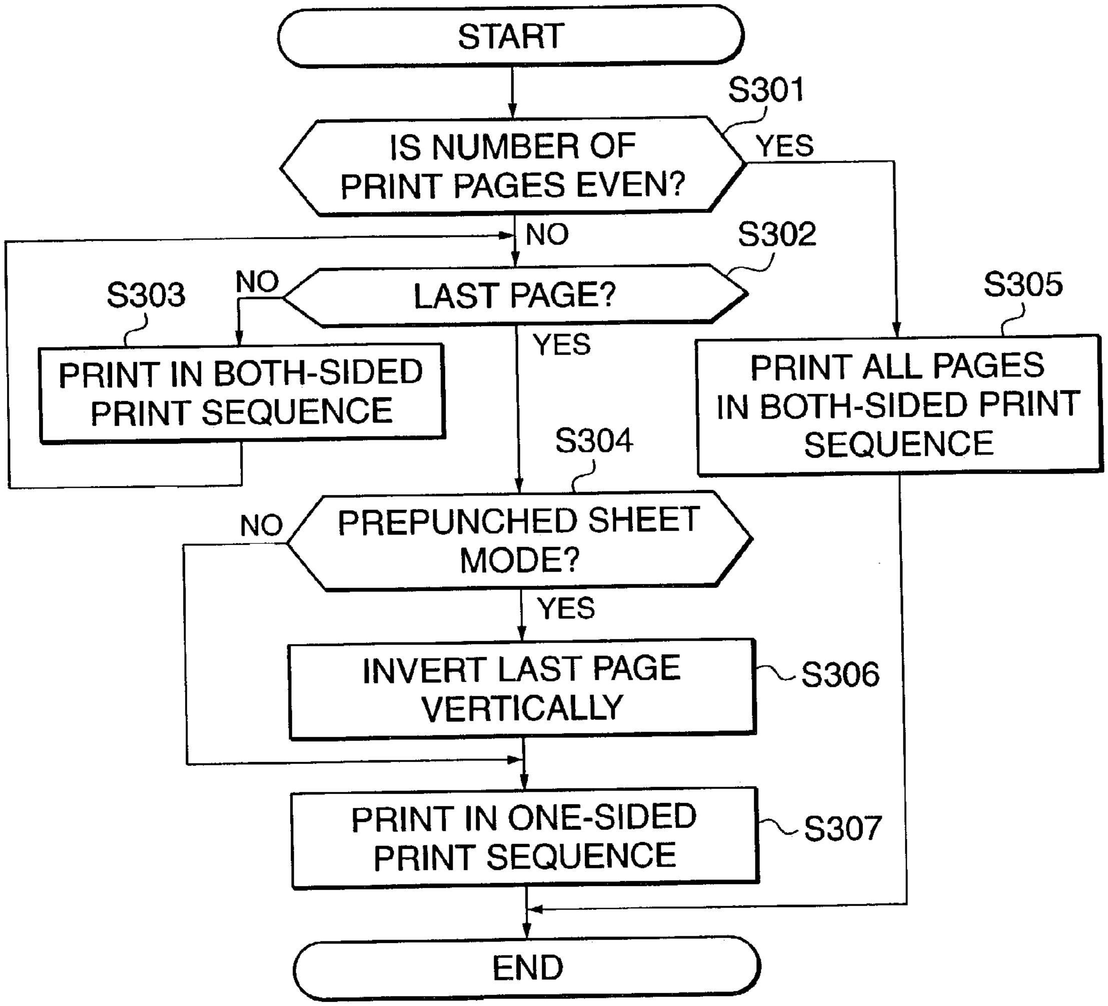
FIG. 5 is a flow chart showing the procedure for switching the print sequence between a double-sided print sequence and a one-sided print sequence according to the third embodiment.

Referring next to a flow chart of FIG. 5, a detailed description will be given of a both-sided printing process carried out by the image forming apparatus according to the third embodiment, which is constructed as described above. FIG. 5 shows the procedure for switching the print sequence between the both-sided print sequence and the one-sided print sequence during both-sided printing according to the third embodiment. The CPU 103 carries out the process shown in the flow chart of FIG. 5 according to the control programs stored in the ROM 104.

First, the CPU 103 of the image forming apparatus determines in a step S301 whether the total number of pages to be printed is even or odd. If it is determined in the step S301 that the total number of pages to be printed is even, the process proceeds to a step S305 wherein the CPU 103 causes the image recording sections to perform printing of all pages in the both-sided print sequence. If it is determined in the step S301 that the total number of pages to be printed is odd, the process proceeds to a step S302 wherein the present page is the last page or not. If it is determined in the step S302 that the present page is not the last page, the process proceeds to a step S303 wherein the CPU 103 causes the image recording sections to perform printing of the last page in the both-sided print sequence, and determines again in the step S302 whether the present page is the last page or not.

If it is determined in the step S302 that the present page is the last page, the process proceeds to a step S304 wherein the CPU 103 determines whether the prepunched sheet mode has been designated or not. If it is determined in the step S304 that the prepunched sheet mode has been designated, the process proceeds to a step S306 wherein the CPU 103 inverts a print image on the last page in the vertical direction. The process then proceeds to a step S307. If it is determined in the step S304 that the prepunched sheet mode has not been designated, the process jumps to the step S307. In the step S307, the CPU 103 causes the image recording sections to perform printing of the last page in the one-sided print sequence irrespective of whether the prepunched sheet mode has been designated or not.

As described above, the image forming apparatus according to the third embodiment enables printing of the odd-numbered last page in the one-sided print sequence by inverting a print image thereon in the vertical direction while achieving the same effects as those of the above described embodiments. It should be noted that the inversion of a print image requires some allowance in the resource of the image forming apparatus.

A description will now be given of a fourth embodiment of the present invention. An image forming apparatus according to the fourth embodiment has the same arrangement of a control system (refer to FIG. 1) and the same schematic interior structure (refer to FIG. 2) as the image forming apparatus according to the first embodiment, and a description thereof is omitted.

In the third embodiment described above, in the case where the total number of pages to be printed is odd and the prepunched sheet mode has been designated, only a print image on the last page is inverted in the vertical direction. In the fourth embodiment, it is determined whether there is any data to be printed on the second side of the next sheet every time printing of one sheet is completed as is the case with the second embodiment, and if there is no data to be printed on the second side of the next sheet and the prepunched sheet mode has been designated, a print image is inverted in the vertical direction.

Figure 6:
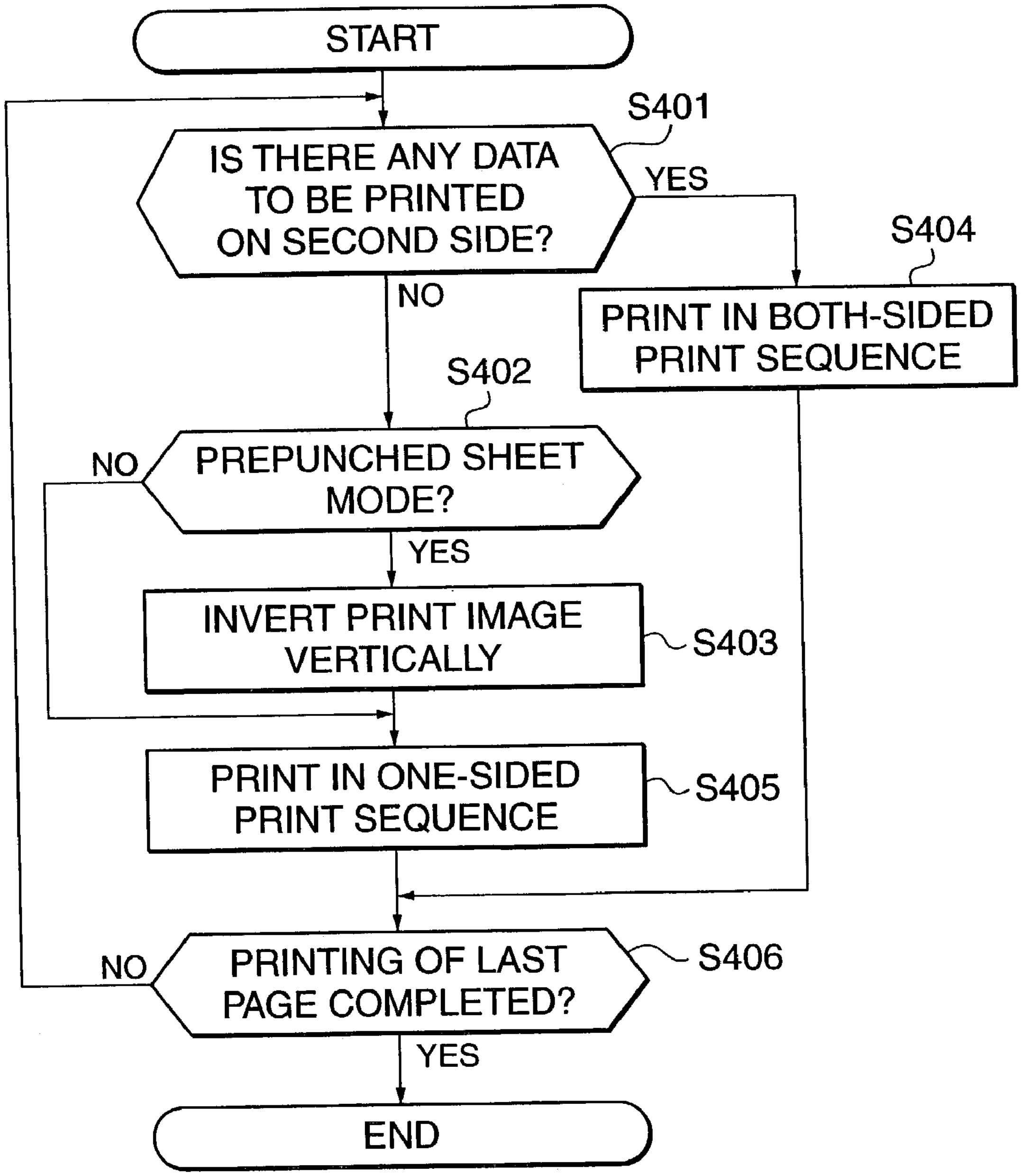
FIG. 6 is a flow chart showing the procedure for switching the print sequence between the double-sided print sequence and the one-sided print sequence according to the fourth embodiment.
Figure 7:
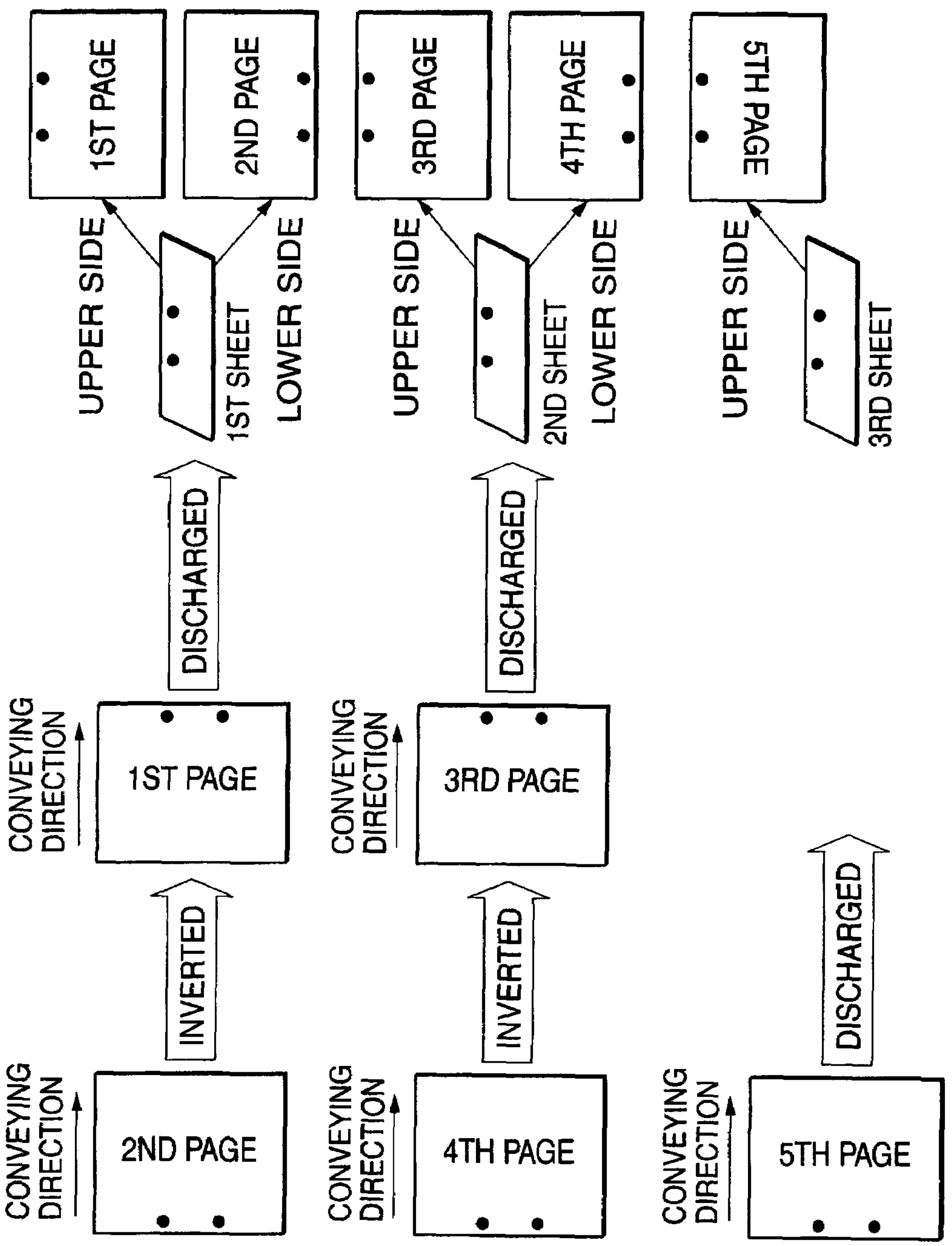
FIG. 7 is a view useful in explaining a difference in printing direction between the double-sided printing sequence and the one-sided printing sequence.

Referring next to a flow chart of FIG. 6, a detailed description will be given of a both-sided printing process carried out by the image forming apparatus according to the third embodiment, which is constructed as described above. FIG. 6 shows the procedure for switching the print sequence between the both-sided print sequence and the one-sided print sequence during both-sided printing according to the third embodiment. The CPU 103 carries out the process shown in the flow chart of FIG. 6 according to the control programs stored in the ROM 104.

First, the CPU 103 of the image forming apparatus determines in a step S401 whether or not there is any print data to be printed on the second side of a sheet to be printed. If it is determined in the step S401 that there is print data to be printed on the second side of the sheet, the process proceeds to a step S404 wherein the CPU 103 causes the image recording sections to perform printing in the both-sided print sequence. If it is determined in the step S401 that there is no print data to be printed on the second side of the sheet, the process proceeds to a step S402 wherein the CPU 103 determines whether the prepunched sheet mode has been designated or not.

If it is determined in the step S402 that the prepunched sheet mode has been designated, the process proceeds to a step S403 wherein the CPU 103 provides control such that a print image on the present page is inverted in the vertical direction. The process then proceeds to a step S405. If it is determined in the step S402 that the prepunched sheet mode has not been designated, the process jumps to the step S405. In the step S405, the CPU 103 causes the image recording sections to perform printing in the one-sided print sequence. In the next step S406, the CPU 103 determines whether printing of the last page has been completed or not. If it is determined in the step S406 that printing of the last page has not been completed, the process returns to the step S401 to perform the above processing. If it is determined in the step S406 that printing of the last page has been completed, the process is terminated.

As described above, the image forming apparatus according to the fourth embodiment performs printing of sheets, for which there is print data to be printed on only one side thereof, in the same printing direction in the one-sided print sequence irrespective of whether the prepunched sheet mode has been designated or not. Therefore, the fourth embodiment can further lower the sheet jamming frequency and prevents wear of component parts as compared with the first to third embodiments while achieving the same effects as the first to third embodiments. Conversely, the image forming apparatus is required to have enough resource because there is the necessity of checking whether there is any print data to be printed on each sheet and there is the possibility that print images on pages other than the last page are required to be inverted in the vertical direction.

Although the above described embodiments is based on the method of controlling switching of the print sequence between the both-sided print sequence and the one-sided print sequence by providing the prepunched sheet mode in which the printing direction of prepunched sheets is made uniform between the both-sided print sequence and the one-sided print sequence, the present invention is not limited to this. The present invention may also be applied to a method of controlling switching of the print sequence between the both-sided print sequence and the one-sided print sequence by providing a preprinted sheet mode in which preprinted sheets, on which predetermined images such as form images, logos, marks, and report formats are printed in advance, are printed in the same direction between the both-sided print sequence and the one-sided print sequence in the case where a problem is caused by a difference in printing direction of output results in one print job between the both-sided print sequence and the one-sided print sequence.

A description will now be given of concrete examples of control provided by this method. The determination in the step S103 in the flow chart of FIG. 3 showing the first embodiment, the determination in the step S203 in the flow chart of FIG. 4 showing the second embodiment, the determination in the step S304 in the flow chart of FIG. 5 showing the third embodiment, or the determination in the step S402 in the flow chart of FIG. 6 showing the fourth embodiment is replaced by a determination as to whether preprinted sheets are to be used for printing or a determination as to whether the preprinted sheet mode has been selected, and the other determinations, control, and processing are executed by the CPU 103 in the same manner as in the above described embodiments.

Alternatively, the determination in the step S103 in the flow chart of FIG. 3 showing the first embodiment, the determination in the step S203 in the flow chart of FIG. 4 showing the second embodiment, the determination in the step S304 in the flow chart of FIG. 5 showing the third embodiment, or the determination in the step S402 in the flow chart of FIG. 6 showing the fourth embodiment is replaced by a determination as to whether sheets for use in printing are sheets of a predetermined media type such as prepunched sheets and preprinted sheets, and the other determinations, control, and processing are executed by the CPU 103 in the same manner as in the above described embodiments.

The prepunched sheets which are punched in advance, the preprinted sheets on which predetermined images are printed in advance, and the like are sheets whose proper printing direction is determined in advance. Thus, the determination in each of the above described steps may be replaced by a determination as to whether the printing direction of sheets is required to be made uniform or a determination as to whether the user has set an image formation mode in which the printing direction is to be made uniform such as the prepunched sheet mode in which prepunched sheets are printed or the preprinted sheet mode in which preprinted sheets are printed, and the other determinations, control, and processing may be executed by the CPU 103 in the same manner as in the above described embodiments.

In this way, various changes and modifications may be possible. The above described embodiments can achieve the same effects as the first to fourth embodiments, and can flexibly address a wide variety of needs.

Although in the above described embodiments, the image forming apparatus performs printing based on electrophotography, the present invention is not limited to this. The present invention may be applied to a variety of printing methods such as inkjet printing, thermal transfer process copying, thermal copying, and electrostatic process copying.

Further, although in the above described embodiments, one image forming apparatus and one information processing apparatus are connected to each other, the present invention is not limited to this. The present invention may be applied to a system in which an arbitrary number of image forming apparatuses and an arbitrary number of information processing apparatuses are connected to each other via a network such as a LAN.

Further, although in the above described embodiments, the present invention is applied to control of switching the print sequence between the one-sided print sequence and the both-sided print sequence in the image forming apparatus (printer) having only the image forming function, the present invention is not limited to this. The present invention may be applied to control of switching the print sequence between the one-sided print sequence and the both-sided print sequence in an image forming apparatus (copying machine) having an image reading function and an image forming function or in an image forming apparatus (complex machine) having a plurality of functions such as an image reading function, an image forming function, and a facsimile function.

The present invention may either be applied to a system composed of a plurality of apparatuses or to a single apparatus. It is to be understood that the object of the present invention may also be accomplished by supplying a system or an apparatus with a storage medium in which a program code of software which realizes the functions of any of the above described embodiments or variations thereof is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention. The storage medium for supplying the program code is not limited to a ROM, and a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a download performed via a network may be used.

Further, it is to be understood that the functions of any of the above described embodiments or variations thereof may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments or variations thereof may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

As described hereinabove, according to the present invention, the image forming apparatus having the mechanism that switches the print sequence between the both-sided print sequence and the one-sided print sequence is provided with the mode in which the print sequence for printing the odd-numbered last page is inhibited from being switched to the one-sided print sequence, so that the printing directions of all pages can be made uniform. Further, in the case where there is a difference in printing direction in both-sided printing, a print image is inverted in the vertical direction to enable printing in the same direction in the one-sided print sequence, thus lowering the sheet jamming frequency and preventing wear of component parts.

What is claimed is:

1. A printing apparatus capable of performing double-sided printing, comprising:

a determining unit adapted to determine whether or not a plurality of print sheets are of a prepunched media type, the plurality of print sheets being subjected to double-sided printing of print data;

an inversion unit adapted to invert a print sheet; and a control unit adapted to control, when the last page of the print sheets subjected to double-sided printing of print data is an odd number and said determining unit determines that the plurality of print sheets are not of the prepunched media type, discharging of the print sheets other than the last print sheet containing the last page among the plurality of print sheets, so that the inversion unit inverts the print sheets other than the last print sheet, and discharging of the last print sheet containing the last page without inverting the last print sheet, wherein said control unit is adapted to control, when said determining unit determines that the plurality of print sheets are of the prepunched media type, discharging all of the plurality of print sheets so that the inversion unit inverts all of the plurality of print sheets, and wherein said control unit is adapted to control, when the last page is an even number, discharging of all of the plurality of print sheets so that the inversion unit inverts all of the plurality of print sheets, regardless of whether or not the plurality of print sheets, which are subjected to double-sided printing, are of the prepunched media type.

2. A printing apparatus according to claim 1, wherein said determining unit is adapted to determine whether or not the plurality of print sheets subjected to double-sided printing of print data are of the prepunched media type, based on the media type set via a user interface provided in an external apparatus.

3. A printing apparatus according to claim 1, wherein said determining unit is adapted to determine whether or not the plurality of print sheets subjected to double-sided printing of print data are of the prepunched media type, based on the media type set via a user interface provided in said printing apparatus.

4. A printing apparatus capable of performing double-sided printing, comprising:

a determining unit adapted to determine whether or not a plurality of print sheets are of a preprinted media type, the plurality of print sheets being subjected to double-sided printing of print data;

an inversion unit adapted to invert a print sheet; and a control unit adapted to control, when the last page of the print sheets subjected to double-sided printing of print data is an odd number and when said determining unit determines that the plurality of print sheets are not of the preprinted media type, discharging of the print sheets other than the last print sheet containing the last page among the plurality of print sheets so that the inversion unit inverts the print sheets other than the last print sheet, and discharging of the last print sheet containing the last page without inverting the last print sheet, wherein said control unit is adapted to control, when said determining unit determines that the plurality of print sheets are of the preprinted media type, discharging all of the plurality of print sheets so that the inversion unit inverts all of the plurality of print sheets, and wherein said control unit is adapted to control, when the last page is an even number, discharging of all the plurality of print sheets so that the inversion unit inverts all of the plurality of print sheets, regardless of whether or not the plurality of print sheets, which are subjected to double-sided printing, are of the preprinted media type.

5. A printing apparatus according to claim 4, wherein said determining unit is adapted to determine whether or not the plurality of print sheets subjected to double-sided printing of print data are of the preprinted media type, based on the media type set via a user interface provided in an external apparatus.

6. A printing apparatus according to claim 4, wherein said determining unit is adapted to determine whether or not the plurality of print sheets subjected to double-sided printing of print data are of the preprinted media type, based on the media type set via a user interface provided in said printing apparatus.

7. A printing apparatus capable of performing double-sided printing, comprising:

a determining unit adapted to determine whether or not a plurality of print sheets are of a prepunched media type, the plurality of print sheets being subjected to double-sided printing of print data with at least one blank page where no data is to be printed;

an inversion unit adapted to invert a print sheet; and a control unit adapted to control, when said determining unit determines that the plurality of print sheets are not of the prepunched media type, discharging of the print sheets other than the print sheet containing the blank page among the plurality of print sheets, so that the inversion unit inverts the print sheets other than the print sheet containing the blank page, and discharging of the print sheet containing the blank page without inverting the print sheet containing the blank page, wherein said control unit is adapted to control, when said determining unit determines that the plurality of print sheets are of the prepunched media type, discharging the print sheets other than the print sheet containing the blank page among the plurality of print sheets, so that the inversion unit inverts the print sheets other than the print sheet containing the blank page, and discharging of the print sheet containing the blank page so that the inversion unit also inverts the print sheet containing the blank page, and wherein said control unit is adapted to control, when the plurality of print sheets are subjected to double-sided printing of print data without the blank page, discharging of all of the plurality of print sheets so that the inversion unit inverts all of the plurality of print sheets, regardless of whether or not the plurality of print sheets, which are subjected to double-sided printing, are of the prepunched media type.

8. A printing apparatus according to claim 7, wherein said determining unit is adapted to determine whether or not the plurality of print sheets subjected to double-sided printing of print data with the blank page are of the prepunched media type, based on the media type set via a user interface provided in an external apparatus.

9. A printing apparatus according to claim 7, wherein said determining unit is adapted to determine whether or not the plurality of print sheets subjected to double-sided printing of print data with the blank page are of the prepunched media type, based on the media type set via a user interface provided in said printing apparatus.

10. A printing apparatus capable of performing double-sided printing, comprising:

a determining unit adapted to determine whether or not a plurality of print sheets are of a preprinted media type, the plurality of print sheets being subjected to double-sided printing of print data with at least one blank page where no data is to be printed;

an inversion unit adapted to invert a print sheet; and a control unit adapted to control, when said determining unit determines that the plurality of print sheets are not of the preprinted media type, discharging of the print sheets other than the print sheet containing the blank page among the plurality of print sheets, so that the inversion unit inverts the print sheets other than the print sheet containing the blank page, and discharging of the print sheet containing the blank page without inverting the print sheet containing the blank page, wherein said control unit is adapted to control, when said determining unit determines that the plurality of print sheets are of the preprinted media type, discharging of the print sheets other than the print sheet containing the blank page among the plurality of print sheets, so that that inversion unit inverts the print sheets other than the print sheet containing the blank page, and discharging of the print sheet containing the blank page so that the inversion unit also inverts the print sheet containing the blank page, and wherein said control unit is adapted to control, when the plurality of print sheets are subjected to double-sided printing of print data without the blank page, discharging of all of the plurality of print sheets so that the inversion unit inverts all of the plurality of print sheets, regardless of whether or not the plurality of print sheets, which are subjected to double-sided printing, are of the preprinted media type.

11. A printing apparatus according to claim 10, wherein said determining unit is adapted to determine whether or not the plurality of print sheets subjected to double-sided printing of print data with the blank page are of the preprinted media type, based on the media type set via a user interface provided in an external apparatus.

12. A printing apparatus according to claim 10, wherein said determining unit is adapted to determine whether or not the plurality of print sheets subjected to double-sided printing of print data with the blank page are of the preprinted media type, based on the media type set via a user interface provided in said printing apparatus.

13. A computer-readable storage medium storing a program for causing a computer to execute a method for controlling a printing apparatus capable of performing double-sided printing, wherein the printing apparatus has an inversion unit adapted to invert a print sheet, the method comprising:

a determining step of determining whether or not a plurality of print sheets are of a prepunched media type, the plurality of print sheets being subjected to double-sided printing of print data;

a control step of controlling, when the last page of the print sheets subjected to double-sided printing of print data is an odd number and when said determining step determines that the plurality of print sheets are not of the prepunched media type, discharging of the print sheets other than the last print sheet containing the last page among the plurality of print sheets, so that the inversion unit inverts the print sheets other than the last print sheet, and discharging of the last print sheet for the last page without inverting the last print sheet, wherein said control step further includes controlling when said determining step determines that the plurality of print sheets are of the prepunched media type, discharging all of the plurality of print sheets so that the inversion unit inverts all of the plurality of print sheets, and wherein said control step further includes controlling, when the last page is an even number, discharging of all of the plurality of print sheets so that the inversion unit inverts all of the plurality of print sheets, regardless of whether or not the plurality of print sheets, which are subjected to double-sided printing, are of the prepunched media type.

14. A computer-readable storage medium storing a program for causing a computer to execute a method for controlling a printing apparatus capable of performing double-sided printing, wherein the printing apparatus has an inversion unit adapted to invert a print sheet, the method comprising:

a determining step of determining whether or not a plurality of print sheets are of a preprinted media type, the plurality of print sheets being subjected to double-sided printing of print data; and a control step of controlling, when the last page of the print sheets subjected to double-sided printing of print data is an odd number and when said determining step determines that the plurality of print sheets are not of the preprinted media type, discharging of the print sheets other than the last print sheet containing the last page among the plurality of print sheets, so that the inversion unit inverts the print sheets other than the last print sheet, and discharging of the last print sheet containing the last page without inverting the last print sheet, wherein said control step further includes controlling, when said determining step determines that the plurality of print sheets are of the preprinted media type, discharging all of the plurality of print sheets so that the inversion unit inverts all of the plurality of print sheets, and wherein said control step further includes controlling, when the last page is an even number, discharging of all the plurality of print sheets so that the inversion unit inverts all of the plurality of print sheets, regardless of whether or not the plurality of print sheets, which are subjected to double-sided printing, are of the preprinted media type.

15. A computer-readable storage medium storing a program for causing a computer to execute a method for controlling a printing apparatus capable of performing double-sided printing, wherein the printing apparatus has an inversion unit adapted to invert a print sheet, the method comprising:

a determining step of determining whether or not a plurality of print sheets are of a prepunched media type, the plurality of printed sheets subjected to double-sided printing of print data with at least one blank page where no data is to be printed; and a control step of controlling, when said determining step determines that the plurality of print sheets are not of the prepunched media type, discharging of the print sheets other than the print sheet containing the blank page among the plurality of print sheets, so that the inversion unit inverts the print sheets other than the print sheet containing the blank page, and discharging of the print sheet containing the blank page without inverting the print sheet containing the blank page, wherein said control step further includes controlling, when said determining step determines that the plurality of print sheets are of the prepunched media type, discharging of the print sheets other than the print sheet containing the blank page among the plurality of print sheets, so that the inversion unit inverts the print sheets other than the print sheet containing the blank page, and discharging of the blank print sheet containing the blank page so that the inversion unit also inverts the print sheet containing the blank page, and wherein said control step further includes controlling, when the plurality of print sheets are subjected to double-sided printing of print data without the blank page, discharging of all of the plurality of print sheets so that the inversion unit inverts all of the plurality of print sheets, regardless of whether or not the plurality of print sheets, which are subjected to double-sided printing, are of the prepunched media type.

16. A computer-readable storage medium storing a program for causing a computer to execute a method for controlling a printing apparatus capable of performing double-sided printing, wherein the printing apparatus has an inversion unit adapted to invert a print sheet, the method comprising:

a determining step of determining whether or not a plurality of print sheets are of a preprinted media type, the plurality of printed sheets subjected to double-sided printing of print data with at least one blank page where no data is to be printed; and a control step of controlling, when said determining step determines that the plurality of print sheets are not of the preprinted media type, discharging of the print sheets other than the print sheet containing the blank page among the plurality of print sheets, so that the inversion unit inverts the print sheets other than the print sheet containing the blank page, and discharging of the print sheet containing the blank page without inverting the print sheet containing the blank page, wherein said control step further includes controlling, when said determining step determines that the plurality of print sheets are of the preprinted media type, discharging of the print sheets other than the print sheet containing the blank page among the plurality of print sheets, so that the inversion unit inverts the print sheets other than the print sheet containing the blank page, and discharging of the print sheet containing the blank page so that the inversion unit also inverts the print sheet containing the blank page, and wherein said control step further includes controlling, when the plurality of print sheets are subjected to double-sided printing of print data without the blank page, discharging of all of the plurality of print sheets so that the inversion unit inverts all of the plurality of print sheets, regardless of whether or not the plurality of print sheets, which are subjected to double-sided printing, are of the preprinted media type.

* * * * *